United States Patent
van der Made

(10) Patent No.: US 10,410,117 B2
(45) Date of Patent: Sep. 10, 2019

(54) METHOD AND A SYSTEM FOR CREATING DYNAMIC NEURAL FUNCTION LIBRARIES

(71) Applicant: BrainChip, Inc., Aliso Viejo, CA (US)

(72) Inventor: Peter A J van der Made, Gosnells (AU)

(73) Assignee: BRAINCHIP, INC., Aliso Viejo, CA (US)

( * ) Notice: Subject to any disclaimer, the term of this patent is extended or adjusted under 35 U.S.C. 154(b) by 1023 days.

(21) Appl. No.: 14/710,593

(22) Filed: May 13, 2015

(65) Prior Publication Data

US 2016/0019457 A1 Jan. 21, 2016

Related U.S. Application Data

(63) Continuation-in-part of application No. 13/461,800, filed on May 2, 2012, now abandoned, which is a
(Continued)

(51) Int. Cl.
*G06N 3/08* (2006.01)
*G06N 3/04* (2006.01)
(Continued)

(52) U.S. Cl.
CPC .............. *G06N 3/08* (2013.01); *G06N 3/049* (2013.01); *G06N 3/063* (2013.01)

(58) Field of Classification Search
None
See application file for complete search history.

(56) References Cited

U.S. PATENT DOCUMENTS 4,896,053 A 1/1990 Kesselring
5,052,043 A 9/1991 Gaborski
(Continued)

FOREIGN PATENT DOCUMENTS

JP   H04-030280 A   2/1992

OTHER PUBLICATIONS

Renaud, Sylvie, et al. "Neuromimetic ICs with analog cores: an alternative for simulating spiking neural networks." Circuits and Systems, 2007. ISCAS 2007. IEEE International Symposium on. IEEE, 2007. (Year: 2007).*
(Continued)

*Primary Examiner* — Eric Nilsson
(74) *Attorney, Agent, or Firm* — Sterne, Kessler, Goldstein & Fox P.L.L.C.

(57) ABSTRACT

A method for creating a dynamic neural function library that relates to Artificial Intelligence systems and devices is provided. Within a dynamic neural network (artificial intelligent device), a plurality of control values are autonomously generated during a learning process and thus stored in synaptic registers of the artificial intelligent device that represent a training model of a task or a function learned by the artificial intelligent device. Control Values include, but are not limited to, values that indicate the neurotransmitter level that is present in the synapse, the neurotransmitter type, the connectome, the neuromodulator sensitivity, and other synaptic, dendric delay and axonal delay parameters. These values form collectively a training model. Training models are stored in the dynamic neural function library of the artificial intelligent device. The artificial intelligent device copies the function library to an electronic data processing device memory that is reusable to train another artificial intelligent device.

17 Claims, 23 Drawing Sheets

Related U.S. Application Data continuation-in-part of application No. 12/234,697, filed on Sep. 21, 2008, now Pat. No. 8,250,011.

(51) Int. Cl.
*G06N 3/06* (2006.01)
*G06N 3/063* (2006.01)

(56) References Cited

U.S. PATENT DOCUMENTS

| | | | |
|---|---|---|---|
| 5,129,038 A | 7/1992 | Kohda | |
| 5,214,745 A | 5/1993 | Sutherland | |
| 5,220,642 A | 6/1993 | Takahashi | |
| 5,222,195 A | 6/1993 | Alkon | |
| 5,239,618 A | 8/1993 | Yamaguchi | |
| 5,247,678 A | 9/1993 | Littleton | |
| 5,247,681 A | 9/1993 | Janis | |
| 5,258,657 A | 11/1993 | Shibata | |
| 5,291,601 A | 3/1994 | Sands | |
| 5,339,430 A | 8/1994 | Lundin | |
| 5,343,555 A | 8/1994 | Yayla | |
| 5,347,613 A | 9/1994 | Chung | |
| 5,355,435 A | 10/1994 | DeYoung | |
| 5,369,766 A | 11/1994 | Nakano | |
| 5,369,770 A | 11/1994 | Thomason | |
| 5,375,241 A | 12/1994 | Walsh | |
| 5,386,497 A | 1/1995 | Torrey | |
| 5,402,522 A | 3/1995 | Alkon | |
| 5,408,585 A | 4/1995 | Burel | |
| 5,438,646 A | 8/1995 | Davidian | |
| 5,450,586 A | 9/1995 | Kazura | |
| 5,465,308 A | 11/1995 | Hutcheson | |
| 5,475,794 A | 12/1995 | Mashiko | |
| 5,475,840 A | 12/1995 | Nelson | |
| 5,553,195 A | 9/1996 | Meijer | |
| 5,588,091 A | 12/1996 | Alkon | |
| 5,630,023 A * | 5/1997 | Oteki | G06F 7/68 706/41 |
| 5,734,904 A | 3/1998 | Kanamori | |
| 5,812,848 A | 9/1998 | Cohen | |
| 7,080,054 B2 | 7/2006 | Wells | |
| 8,095,447 B2 | 1/2012 | Stephens | |
| 8,250,011 B2 | 8/2012 | van der Made | |
| 2002/0038294 A1 | 3/2002 | Matsugu | |
| 2003/0097230 A1 | 5/2003 | Garabedian | |
| 2006/0036559 A1 | 2/2006 | Nugent | |
| 2008/0071710 A1 | 3/2008 | Serre | |
| 2008/0319947 A1 | 12/2008 | Latzina | |
| 2009/0006179 A1 | 1/2009 | Billingsley | |
| 2009/0287624 A1 | 11/2009 | Rouat | |
| 2010/0076916 A1 | 3/2010 | van der Made | |
| 2013/0297537 A1 | 11/2013 | van der Made | |
| 2014/0089232 A1 * | 3/2014 | Buibas | G06N 3/049 706/11 |
| 2016/0019457 A1 | 1/2016 | van der Made | |

OTHER PUBLICATIONS

Porrmann, Mario, et al. "Implementation of artificial neural networks on a reconfigurable hardware accelerator." Parallel, Distributed and Network-based Processing, 2002. Proceedings. 10th Euromicro Workshop on. IEEE, 2002. (Year: 2002).*

Roth, "OnLine Hebbian Learning for Spiking Neurons: Architecture of the Weight-Unit of NESPINN." Artificial Neural Netowrks—ICANN'97 Lecture Notes in Computer Science 1327: 1217-1222 Oct. 8, 1997.

Demuth, "Neural Network Toolbox 6 User's Guide." published online Mar. 1, 2009.

Long, "Biologically-Inspired Spiking Neural Networks with Hebbian Learning for Vision Processing." AIAA Paper No. 2008-0885, presented at the AIAA 46th Aerospace Sciences Meeting, Reno, NV Jan. 7, 2008.

Gensym, "NeurON-Line" published online, archived Jul. 12, 2003.

Gawade, "How to save the trained neural network." Dec. 21, 2009.

Wang, "Programmable Synaptic Weights for an aVSLI Network of Spiking Neurons." ISCAS 2006 IEEE May 21, 2006.

Koosh, "VSLI Neural Network with Digital Weights and Analog Multipliers." The 2001 IEEE International Symposium on Circuits and Systems, 2001 ISCAS 2001, 2:233-236 May 6, 2001.

Gunther, "Neuralnet: Training of Neural Networks" The R Journal vol. 2/1 Jun. 1, 2010.

Kumagai, "Structured Learning in Recurrent Neural Network Using Genetic Algorithm with Internal Copy Operator." IEEE Apr. 13, 1997.

Gerstner, "Rapid Signal Transmission by Populations of Spiking Neurons." Ninth International Conference on Artificial Neural Networks 1:7-12 Sep. 7, 1999.

Hoppensteadt, "Oscillatory Neurocomputers with Dynamic Connectivity." Physical Review Letters 82 (14):2983-2986 Apr. 5, 1999.

Indiveri, "A VLSI Array of Low-Power Spiking Neurons and Bistable Synapses with Spike-Timing Dependent Plasticity." IEEE Transactions on Neural Networks 17(1):211-221 Jan. 1, 2006.

Izhikevich, "Simple Model of Spiking Neurons." IEEE Transactions on Neural Networks 14(6):1569-1572 Nov. 1, 2003.

Izhikevich, "Weakly Coupled Oscillators." Encyclopedia of Mathematical Physics Elsevier 5:448-452 May 7, 2005.

Lazzaro, "Low-Power Silicon Spiking Neurons and Axons." IEEE International Symposium on Circuits and Systems, San Diego, CA 5:2220-2223 May 10-13, 1992.

McCulloch, "A Logical Calculus of the Ideas Immanent in Nervous Activity" Bulletin of Mathematical Biophysics 5:115-133 Dec. 1, 1943.

Namarvar, "A New Dynamic Synapse Neural Network for Speech Recognition." Proceedings of the International Joint Conference on Neural Networks 4:2985-2990 Feb. 1, 2001.

Tsien, "The Memory Code." Scientific American 297(1):52-59 Jul. 1, 2007.

Schemmel, "Implementing Synaptic Plasticity in a VLSI Spiking Neural Network Model." International Joint Conference on Neural Networks, Sheraton Vancouver Wall Centre Hotel, Vancouver BC, Canada Jul. 16-21, 2006.

Schrauwen, "Compact Digital Hardware Implementation of Spiking Neural Networks." Sixth FirW Ph. D. Symposium May 1, 2005.

Upegui, "An FPGA Platform for on-line topology exploration of spiking neural networks." Microprocessors and Microsystems 29(5):211-223 Jun. 1, 2005.

Schoenauer, "MASPINN: Novel Concepts for a Neuro-Accelerator for Spiking Neural Networks." Proc. SPIE 3728, Ninth Workshop on Virtual Intelligence/Dynamic Neural Networks 87 Mar. 22, 1999.

* cited by examiner

METHOD AND A SYSTEM FOR CREATING DYNAMIC NEURAL FUNCTION LIBRARIES

CROSS-REFERENCES TO RELATED APPLICATIONS

This application is a continuation-in-part of U.S. patent application Ser. No. 13/461,800, filed on May 2, 2012, which is a continuation-in-part of U.S. patent application Ser. No. 12/234,697, filed on Sep. 21, 2008, now U.S. Pat. No. 8,250,011, the disclosures of each of which are hereby incorporated by reference in their entirety.

BACKGROUND OF THE INVENTION

First Generation artificial neural networks were based on the simplified neural model of Warren S. McCulloch and Walter Pitts. The McCulloch-Pitts neuron was presented in their 1943 paper "A Logical Calculus of Ideas Immanent in Nervous Activity". The McCulloch-Pitts neuron is also known as a Threshold Gate, which takes a plenitude of Boolean inputs and returns a single Boolean output. The output is logic '1' when the inputs are greater or equal to a defined threshold value. The transfer function is a logic AND, OR or NOT function. First generation neural networks used the McCulloch-Pitts neuron as the basic computation unit in a single layer without feedback.

Second generation artificial neural networks are based on McCulloch-Pitts neurons modified to use a sigmoid activations function and a continuous set of possible output values. In 1957 the 'Perceptron', also known as the MARK1 was presented at the Cornell Aeronautical Laboratory, in a paper by Frank Rosenblatt. The Perceptron is a single-layer, feed-forward artificial neural network.

Third generation artificial neural networks are based on 'integrate and fire' neurons, whereby the synaptic strength is expressed as a static value. Such networks are trained by manually or programmatically adjusting this static value. Most neural network models are based on the following three assumptions. Firstly, the efficacy of a synapse in generating a synaptic potential is assumed to be static for a resulting action potential in neurons. The efficacy of a synapse is essentially a constant. Certain models modify this assumption by allowing a slow variation over a period of processing many variables. In the second assumption, each sending neuron provides the same signal to all other neurons to which it is connected by some means. Thirdly, the network is trained by direct or indirect manual means. Most networks are feed-forward networks with no feedback.

A common artificial neural network used in predictive and analysis machines is the Hopfield network. Nodes in a Hopfield network are static binary threshold units. The output Alpha_i of a unit can either be logic 1 or logic 0, if the summed input exceeds the threshold value Phi: E represents the energy of the junction. Wij is the strength of the connection. S is the state of unit j and Phi is the threshold value. A Hopfield network stabilizes at the minimum energy level at all junctions. Boltzmann machines add an annealing factor to the Hopfield equation. Boltzmann machines are capable of learning limited internal representations.

In previous instances of neural networks many of the neuron functions have been compromised in order to force functional results. This compromise has resulted in dedicated machines while the biological model is in contrast adaptive. The mentioned networks are based upon antiquated models of biological neurons whereby the temporal character of activation patterns and the functions of feedback and inhibition are largely ignored. The model that is presented here removes these assumptions allowing the construction of adaptive autonomous learning neural networks.

Function libraries have been used in computer programs for some time. Dynamic Link libraries are extensive used in computer programs today. A Dynamic Link Library provides external functionality to computer programs through the substitution of call addresses. In addition to Dynamic Link Libraries, programming libraries provide source code or machine code that the programmer can include in programs. In such cases the functions are called directly and are included in the object code when the program is compiled. Specific programming libraries for Artificial Intelligence applications contain functions, expressed as programming steps, which control certain aspects of the Artificial Intelligence procedure. Each Artificial Intelligence application program is individually coded and no growth path or re-usable code is generated. In learning systems, the learning function is coded as programming steps and limited to a narrow scope within the range of the application program. In contrast, the functions in a Dynamic Neural Function Library are not called from programs and do not comprise program steps. The functions in the Dynamic Neural Function Library are expressed as values which represent the properties of temporal-spatial patterns, which represent a function when they are uploaded or combined in an Intelligent Target System. A common hardware platform, specifically designed for the creation of cognitive systems, aids in the creation of a generic growth path. Dynamic Neural Function Libraries complete the creation of a growth path with re-usable and combinable functions.

SUMMARY OF THE INVENTION

One embodiment of a system for information processing includes a plurality of digital synapse circuits and a neuron soma connected to communicate with one another and configured in a hierarchical array to produce at least one output signal in response to at least one input signal. Additionally, the neuron soma circuit is a digital neuron soma circuit.

One aspect of the present invention provides an improved neural network model that removes the above described assumptions and enables the network to autonomously learn to perform complex tasks. The present invention includes information processing systems and methods that are inspired by and are configured to extend certain aspects of a biological neural network. The combined functions of a plurality of synaptic circuits connected to a neuron soma circuit, jointly called an artificial neuron, correspond to biological synapses, and a neural soma, respectively. Construction of the artificial neuron array from standard binary logic gates, whereby analogue values are simulated in registers, has allowed the creation of large arrays in VLSI devices using current state of the art semiconductor manufacturing techniques. In an embodiment, the analogue values are simulated as multi bit values in registers.

Each of the synaptic circuits may comprise any one or a combination of sensory devices such as a multi-element microphone, an artificial cochlea, a multi-element optical device, a biological unit, or a chemical material.

Depending on synaptic strengths that are the result of learning, and the artificial neuron previous activation history, different artificial neurons in general respond differently to the same input signal. The output of each artificial neuron provides a probability that the spatial and temporal input pattern closely approximates a pattern that was learned previously, and is indirectly represented in the strength values stored in the synapses. This produces different output signals, selecting a group or several groups of interneurons which in turn perform similar temporal probability functions and so on up the hierarchy. This provides a specific way of transforming a spatial-temporal pattern consisting as a signal train of spikes into a hierarchical spatial-temporal pattern of activation that increases in complexity as the data is progressed through the hierarchy, and correspondingly reduces data intensity. Concurrently the hierarchical network of neurons and inter-neurons is learning to respond to certain spatial-temporal characteristics of input signals. Learning occurs autonomously, and is derived from a biological process known as Synaptic Time Dependent Plasticity or STDP. This learning method involves a synapse strength value that determines the coupling factor between neurons. The synaptic strength value is increased when the input pulse precedes the output pulse and decreased when the output pulse precedes the input pulse. Pulses are also commonly referred to as SPIKES and the two terms are used in an interchangeable manner.

The synapse strength value increase is greatest at the shortest interval between the input pulse and the occurrence of an output pulse. The synapse strength value decrease is greatest at the shortest interval between an output pulse and an input pulse. Additionally, the neurotransmitter strength value is not changed in the case when both input and output pulses occur at the same time.

The present invention relates to the processing of information by means of an array consisting of a plurality of dynamic artificial neurons, connected as a hierarchical artificial neural network, and more particularly, to neural network models that simulate or extend biological neural networks. Autonomous learning occurs when a synaptic strength value within the array is increased or decreased as a result of the temporal difference of an input pulse related to a soma feedback output pulse.

A biological nervous system comprises a complex network of neurons that receive and process input signals received from external stimuli to process and store information. A biological nervous system can be described as a large hierarchical array forming a probable content addressable associate memory. A neuron is a specialized cell capable of communicating with other cells. A neuron can be described as a cell body called soma, having one or more dendrites as terminals for input signals and an axon as an output terminal. One dendrite of a neuron and one axon of another neuron are connected by a biological structure called a synapse. The soma of a neuron produces a variable set of pulses of a particular frequency and interval known as action potentials when triggered by the sum of potentials received from a plurality of synapses, connected to dendrites, thereby allowing one neuron to communicate with a plurality of other neurons. Synapses can be excitatory or inhibiting. In this manner a neural network comprises a plurality of neurons that are interconnected by synapses. A synapse can be described as a memory element, that retains a value that is dependent on previous activation of the pre- and postsynaptic neurons as a result of incoming stimuli. A plurality of networked neurons is triggered in an indicative spatial and temporal activation pattern as a result of a specific input signal pattern. Each input pulse relates to an event. An event can be described as the occurrence of a specific frequency in an audio stream, the occurrence of a dark to light transition in visual information, and a plethora of other phenomena. Feedback of output pulses to synaptic inputs drives a process known as Synaptic Time Dependent Plasticity, commonly abbreviated as STDP, whereby the strength of a synapse is modified depending on the temporal different of input to output pulses. This process is thought to be responsible for learning and memory functions in the brain. Massive feedback connections attach neurons at lower layers to events at higher regions. Event phenomena at higher levels in the hierarchy are more complex. Instead of triggering on the occurrence of a specific frequency, the inputs to a higher-level neuron represent the combined output of neurons at lower levels and it triggers on a phoneme. A brain can be modeled as a neural network with massive feed-forward and feedback connections, which processes information by the spatial and temporal activation pattern of neurons in the network. The human brain contains an estimated 10.sup.11 neurons interconnected through an estimated 10.sup.14 synaptic connections.

One description of the operation of a general neural network is; a context addressable associative memory system wherein the content is dynamically derived from the probability of input patterns to stored synaptic strengths. In an additional embodiment, the content is dynamically derived from the probability of input patterns to previously learned and stored synaptic neurotransmitter strengths. An action potential is generated in the post-synaptic neuron when an input pulse causes sufficient positively charged neurotransmitters to be released into the synaptic deft. Additional embodiment discloses the action potential or the membrane potential is increased or decreased in the post-synaptic neuron in case of one input pulse or multiple input pulses. The synaptic cleft is the space between the synapse and the dendrite of a neuron cell. The synaptic potentials all synapses are integrated to produce a summed membrane potential. The membrane potential is slowly discharging towards the rest state, and temporally recharged by subsequent pulses Inhibiting synapses have the opposite effect, causing the membrane potential to be lowered toward, or below the rest potential and making it less likely that the soma will produce an action potential. The neuron soma produces an action potential when the rate of discharge and subsequent recharging results in a membrane potential that matches or exceeds a predefined but variable threshold. The neuron generates a pulse train that has a typical duration and interval period. This pulse train then propagates through one or more axons to synapses of other neurons. Each neuron secretes only one particular neurotransmitter, which is either excitatory or inhibiting. In the present embodiment the axon hillock contains at least one multiplier and registers to compute the output pulse depending on a selectable neuron type. Feedback channels modify the properties of the neuron to strengthen or weaken the interaction between neurons and cause a variation in the membrane threshold value. Action potentials form precise temporal patterns or sequences as spikes trains. The temporal properties of spikes are indicative of the selection of specific neurons within the hierarchy in a process referred to as 'Neuro-percolation'. The coordinated activity of a large section of the population of neurons is required to express information in a biological neural network. The above process forms the basis for information processing, storage, recall and exchange in biological neural networks and this process is replicated it the present embodiment of the invention.

The present invention also relates to a method of accessing learned functions in an intelligent target device, such as the "Autonomous Learning Dynamic Artificial Neural Computing Device and Brain Inspired System" referenced in patent application number 20100076916 and, in particular to a method of accessing value sets, representing learned functions, held in a function library in a computing device. The present invention also relates to an intelligent target device controlled by the method.

The term computing device as used herein is to be widely construed to cover any form of electrical device and includes microcontrollers and wired information devices.

The intelligent target device operates under the control of an operating device. The operating device can be regarded as the values that are stored in synaptic. In an embodiment, values are stored in dendric, soma and axon hillock registers. The stored control values determine the behavior of individual processing nodes of the intelligent target device. The control values are autonomously generated by the intelligent target device.

The intelligent target device learns autonomously from an input stream that is generated by one or more sensory devices, and modifies values in synaptic registers that determine the behavior of a processing node. The output of the processing node is a pulse, or a sequence of pulses, which represent the integrated time relationship between input pulses, and stored values that represent the learned timing sequence and relative positioning of previously received pulses. The timing sequence and relative positioning represents temporal-spatial patterns in the input stream, expressed as values in synaptic registers. The contents of synaptic registers comprise control values. The dynamic neural function library contains sets of such control values, representing learned tasks. In an additional embodiment, the library contains sets of control values in combination with dendric control values, somatic control values and axon hillock control values, representing learned tasks. In addition to these control values each synapse stores a value that is indicative of an address that is assigned to each neuron. A connection between a neuron axon and a synapse is created where the stored value and the neural address match.

Each learned task is a precious resource. Especially complex tasks, such as the recognition of objects, or human speech, can take a long time to evolve through learning. Constructing such complex tasks on simpler task training models that are uploaded from a library helps to shorten training time, as well as creating a more structured hierarchical approach to training the intelligent target device.

Human knowledge is hierarchical in nature, in which complex knowledge is layered on top of simpler, more basic knowledge. Before a child can learn to speak, it needs to be able to understand spoken words. Spoken words consist of phonemes, which consist of consonants and vowels, which consist of specific frequencies. A child therefore learns in early infancy to recognize frequencies, then learns to recognize specific sounds representing vowels and consonants. Subsequently the child learns to recognize phonemes and eventually whole words and words in context in sentences. The child learns to associate words with objects, to associate between information received by the auditory cortex and information received by the visual cortex.

The information stored in an intelligent target device is similarly hierarchical in nature, consisting of training models that define aspects of a learned function. Complex training models are created by uploading and combining the training models of simpler functions. Further training builds this patchwork of functionality into a consistent model and an autonomously fashioned hierarchy.

Diverse manufacturers using dynamic neural network technologies, such as the intelligent target device, may produce training sets consisting out of values autonomously formed in synaptic registers, and representing learned real world events. Real world events are encoded by various sensory devices as sequences of timed pulses. The values that are subsequently stored in synaptic registers are representative of the timing of these pulses and their relationship in time to one another.

Notwithstanding that a particular training set is unique, a consistent hardware platform such as the afore mentioned intelligent target device allows the training value sets of diverse manufacturers to be combined and to be used on another intelligent target device, particularly where the amount of dynamic neural nodes or the quantity of synaptic registers are different between the two devices.

Certain functions that are present in the hierarchy are likely to be common to multiple applications. To augment the efficient use of device training resources, the values representing these autonomously learned functions within the intelligent target device are accessed and stored in a library on a computing device The method that is described here comprises a function library, in that it contains functions that are performed by an automated system. However, contrary to the functions that are stored in a dynamic link library, these functions are not called from computer programs. The function is comprised of values that are representative of temporal-spatial patterns that have been learned by an intelligent target device and have been recorded by reading the synaptic registers of such a device. The intelligent target device is not programmed. In its place it learns to recognize temporal-spatial patterns in sensory input streams from exposure to such streams.

DETAILED DESCRIPTION

Figure 6:
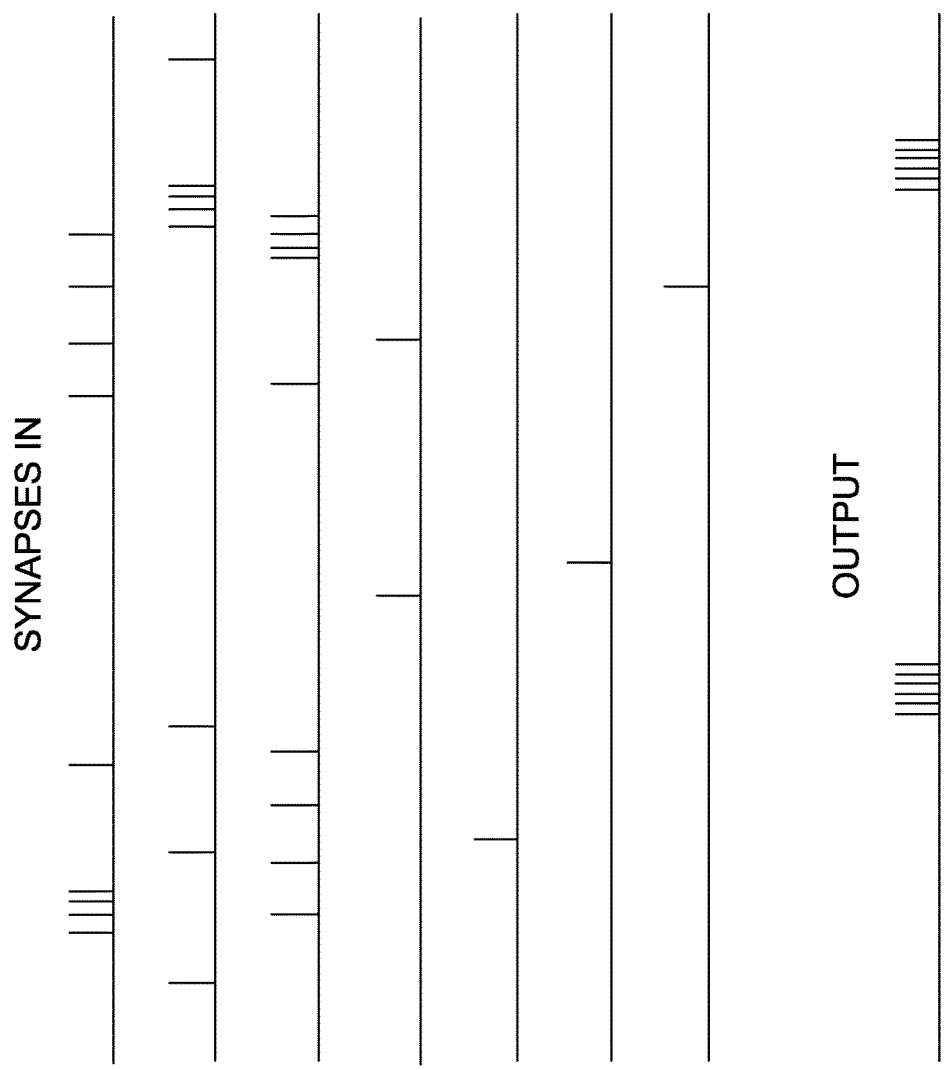
FIG. 6 depicts a simulation of synaptic output and soma pulse train output.
Figure 7:
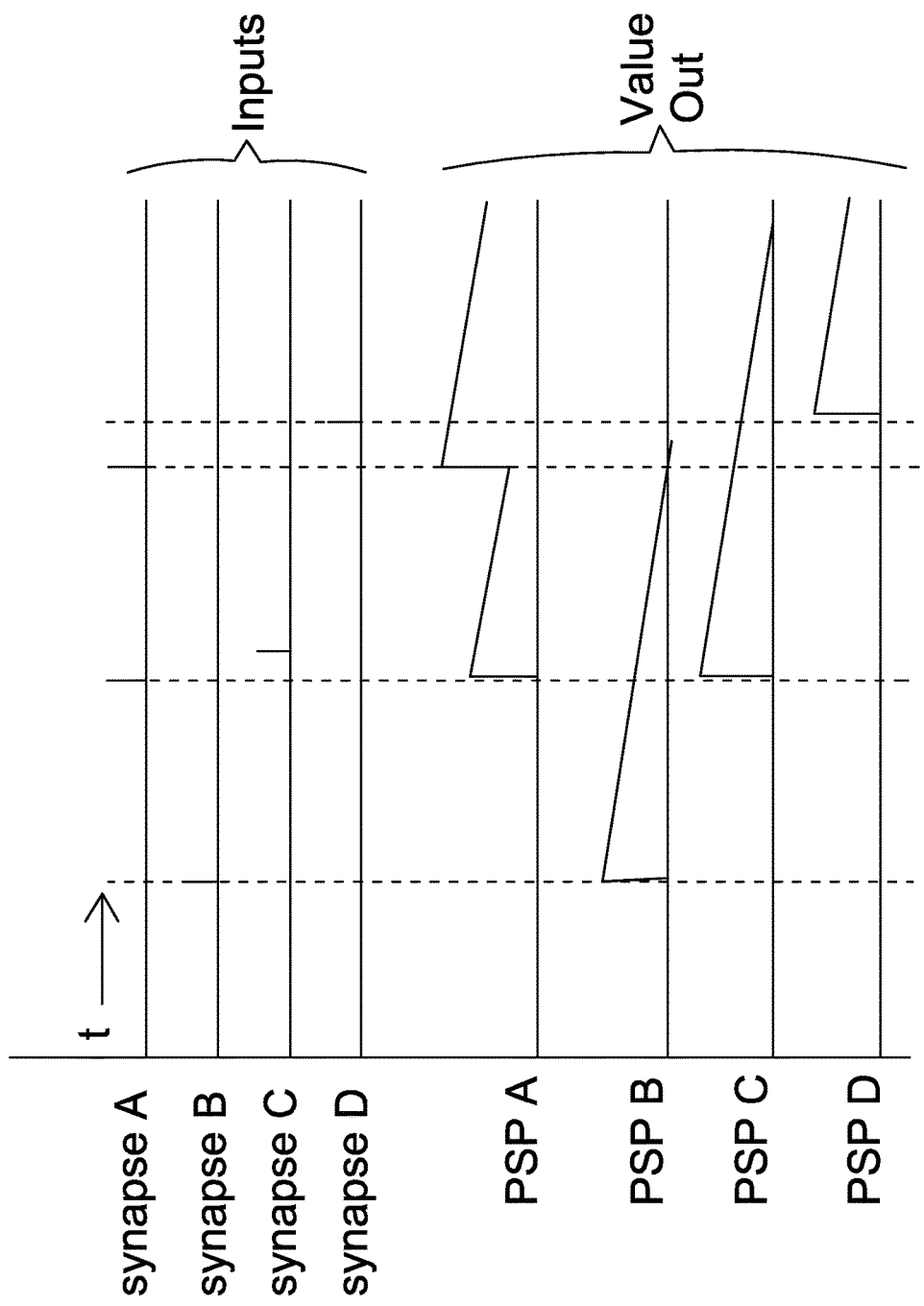
FIG. 7 depicts a response of each synapse circuit to a series of input pulses.
Figure 8:
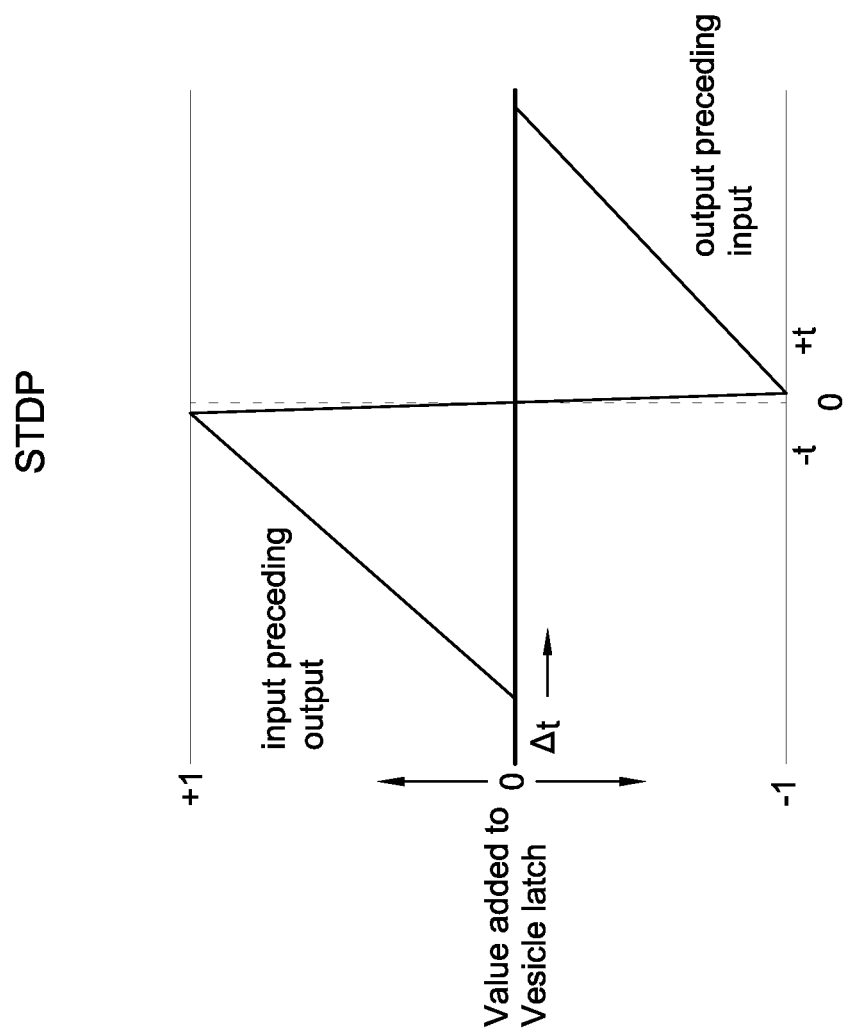
FIG. 8 shows a representation of Synapse time dependent plasticity (STDP) circuit response.
Figure 9:
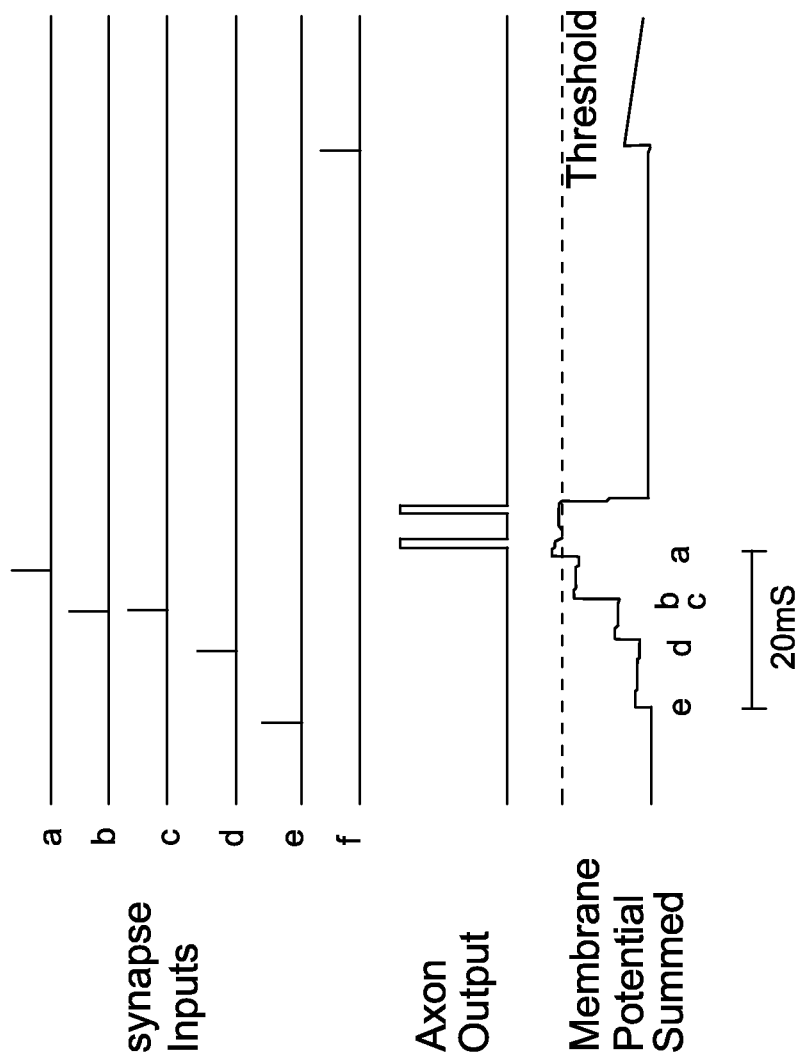
FIG. 9 depicts an artificial Neuron Membrane Potential value relative to synaptic inputs.
Figure 10:
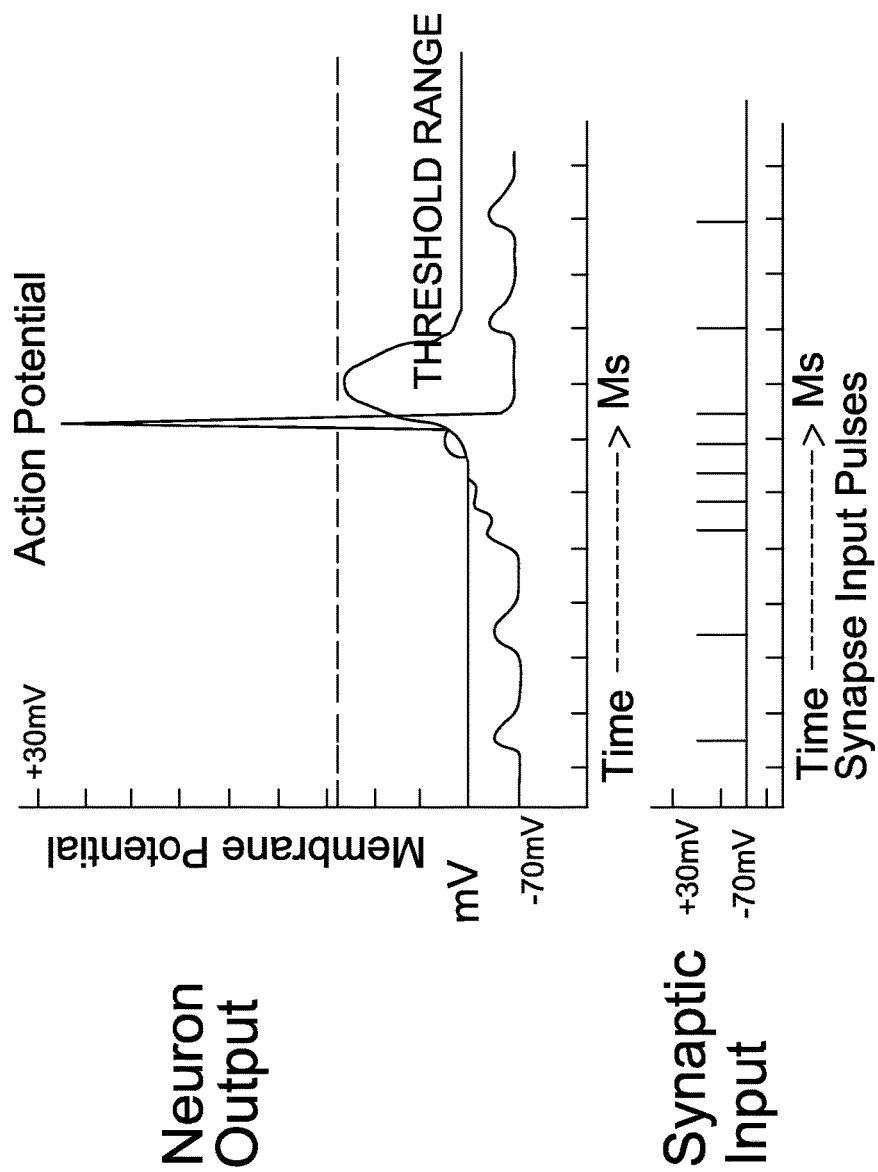
FIG. 10 depicts a biological synaptic input pulses and neuron action potential response.

A plurality of soma circuits is connected through a plurality of dynamic synapse circuits in a hierarchical array. An artificial neuron consists out of at least one synapse circuit and one soma circuit. The synapses receive input pulses derived from other artificial neurons including artificial neurons that are connected to sensory devices. The soma produces an action potential when the synaptic inputs approximate a previously learned pattern, and whereby different artificial neurons produce different output pulses given the same input signals. One instance of neuron input waveforms and a response is shown in FIG. 6. The synapse circuit exhibits dynamic behavior. The synapse strength is altered according to the graph shown in FIG. 8. In FIG. 8, the time difference Delta t is directly related to the artificial neuron clock speed. The synapse strength is increased when the artificial neuron synaptic input pulse precedes the soma output pulse by time t and by a value varying between −1 and +1 shown in the graph margin. In an additional embodiment, the value may also vary between 0 and +1, shown in the graph margin. The synapse strength is decreased when the artificial neuron soma output pulse precedes the synaptic input pulse and thus did not contribute to the membrane potential that caused the output pulse. In an embodiment, the artificial neuron soma output pulse precedes the synaptic input pulse by a value −1 and 0. The decrease value is a function of time which is shown in the graph in FIG. 8. In biological neural systems a soma output pulse is described as an action potential, and occurs when the membrane potential reaches a certain threshold. In an additional embodiment, multiple pulses, defined as a 'burst' may be generated depending on the configuration properties of the axon hillock circuit, as will be shown in following figures. FIG. 10 shows a graph representing a typical biological neuron action potential in response to an input pulse train. The input pulse train is shown below the action potential graph. The membrane potential is increased each time an input pulse occurs. A number of input pulses are required to bring the membrane potential within the threshold range, at which time an action potential is generated. FIG. 7 shows the input signals to four artificial synapses and the corresponding output before integration, labeled PSP A to PSP D. 'PSP' refers to the simulated Post Synaptic Potential, which is referred to as PSP hereinafter. According to the biological neuron response shown in FIG. 10, the output value is increased in response to an input pulse. Signals PSP A to PSP D are integrated to form a simulated membrane potential value. FIG. 9 shows an integrated "Membrane Potential" in relation to synapse inputs {a.b.c.d.e.f} and the resulting action potential labeled "Axon Output".

What follows is a detailed description of the operation of one embodiment of the artificial neuron.

Synapse Circuit

In the preferred embodiment a plurality of synapse circuits is provided, constructed from standard Boolean logic gates within a device. Referring to the synapse 'PSP' circuit diagram in FIG. 1B, the input pulse signal (SYNIN) is conditioned to be the duration of at least one clock signal cycle by a pair of Flip-Flop circuits. Hereinafter, the synaptic input is referred to as SYNIN. The SYNIN input signal is connected to both the Synaptic Time Dependent Plasticity (STDP) circuit in FIG. 1C and the Post Synaptic Potential (PSP) circuit. The output value of all synapse PSP circuits are integrated in an array adder circuit and input to the Soma circuit and forms then the artificial neuron membrane potential value.

Figure 1A:
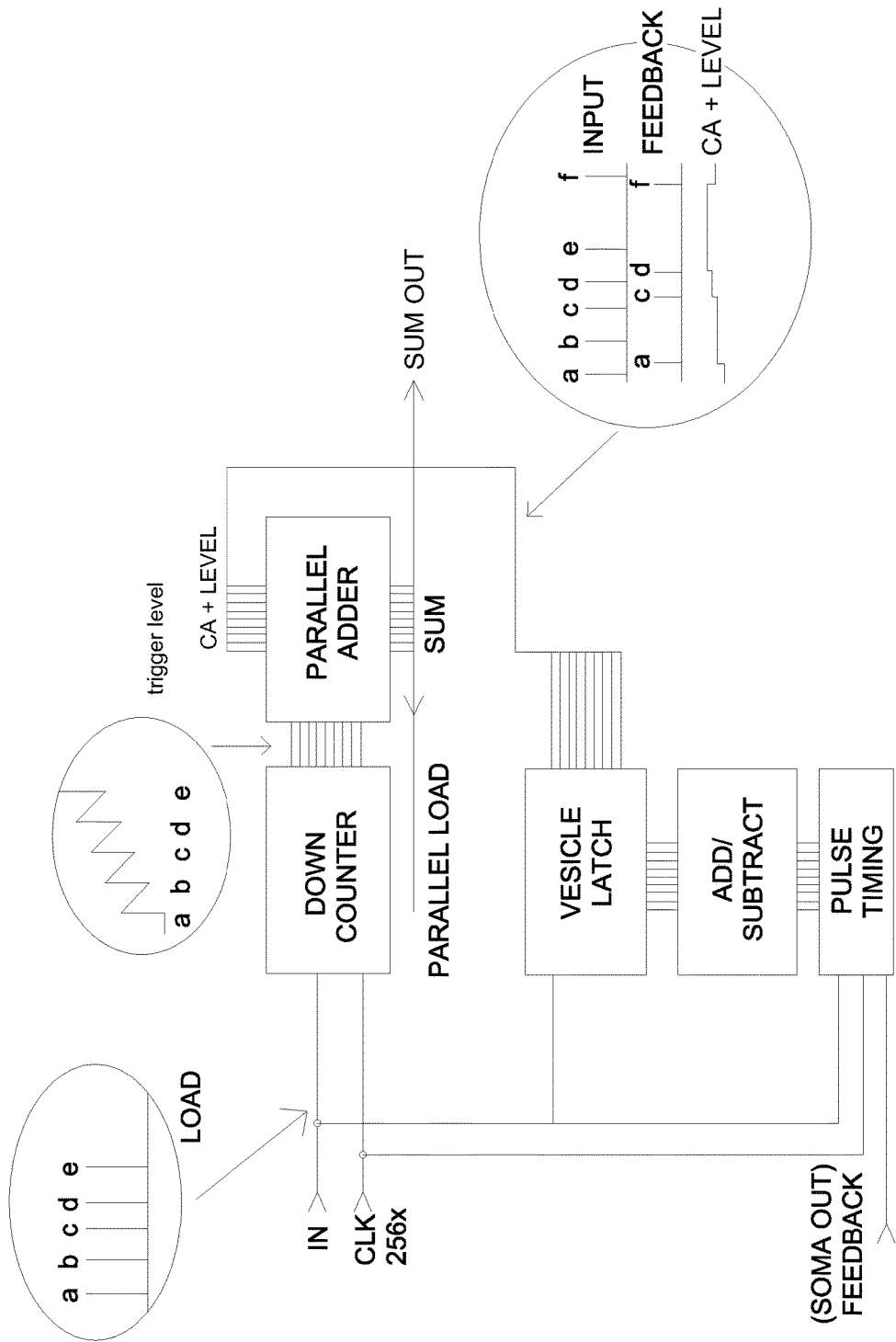
FIG. 1A depicts an Artificial Synapse block diagram.
Figure 1B:
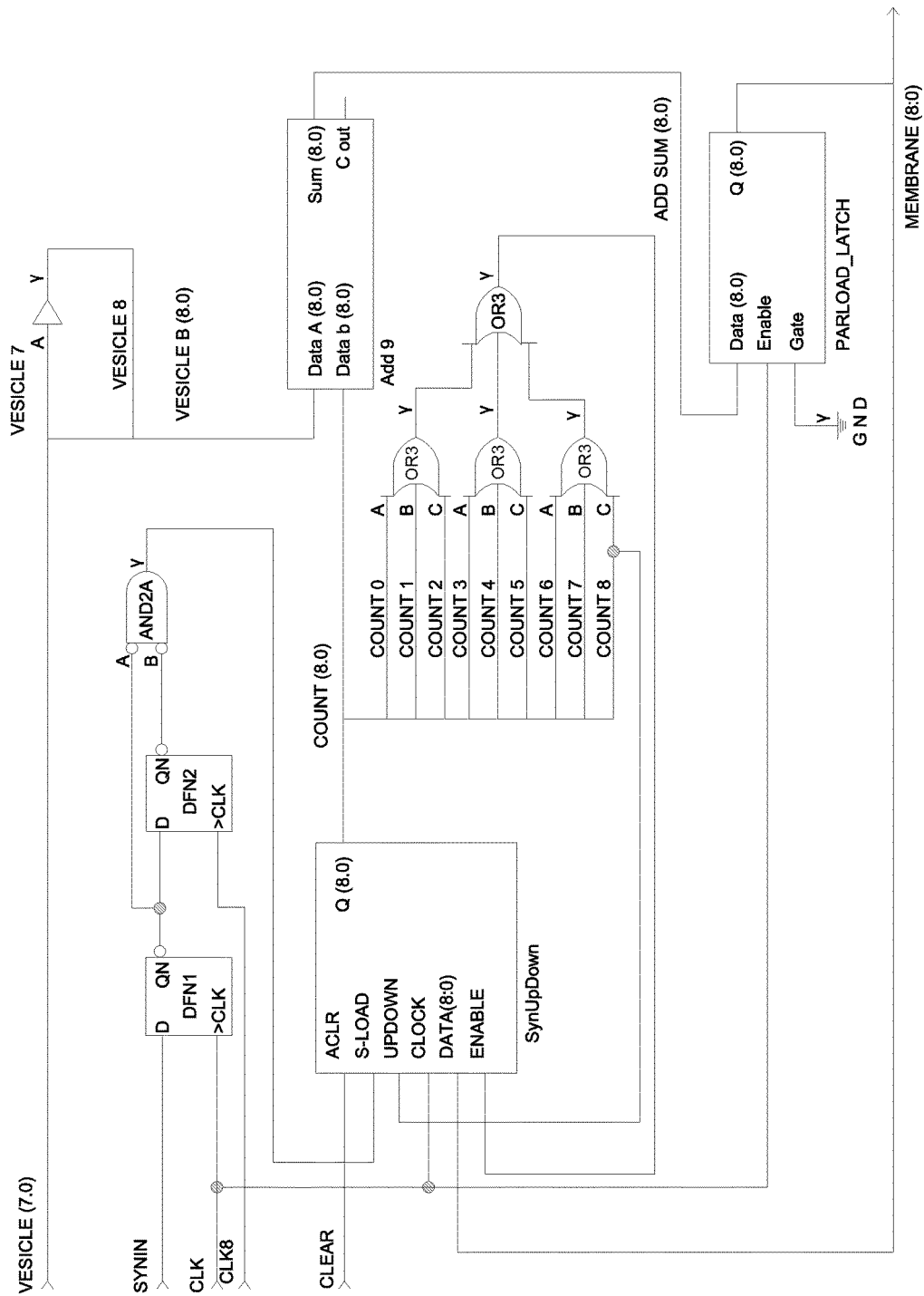
FIG. 1B depicts a CAD system drawing: Circuit diagram of artificial synapse PSP circuit.

The PSP circuit in FIG. 1B comprises a down-counter circuit COUNTER that is inhibited when the count reaches zero by four 3-input OR gates. The delayed and conditioned SYNIN signal is connected to the Synchronous LOAD input of COUNTER and causes the counter to be loaded with the contents of register PARLOAD_LATCH9. The PARLOAD_LATCH9 register contents is comprised of the output of counter circuit COUNT added with the value output by the circuit in FIG. 1C designated VESICLE[7:0]. This simulates the increase in Post Synaptic Potential (PSP) caused by the insertion of vesicles into the synaptic deft. Counter circuit COUNT is decremented one every subsequent dock period. The COUNT value is output to the soma circuit and represents the Post Synaptic Potential or PSP. Each of the PSP values output by the synapse is integrated in the SOMA circuit and forms an artificial neuron Membrane Potential value. In an embodiment, each of the PSP values output by the synapse is integrated in the DENDRITE circuit.

Figure 1C:
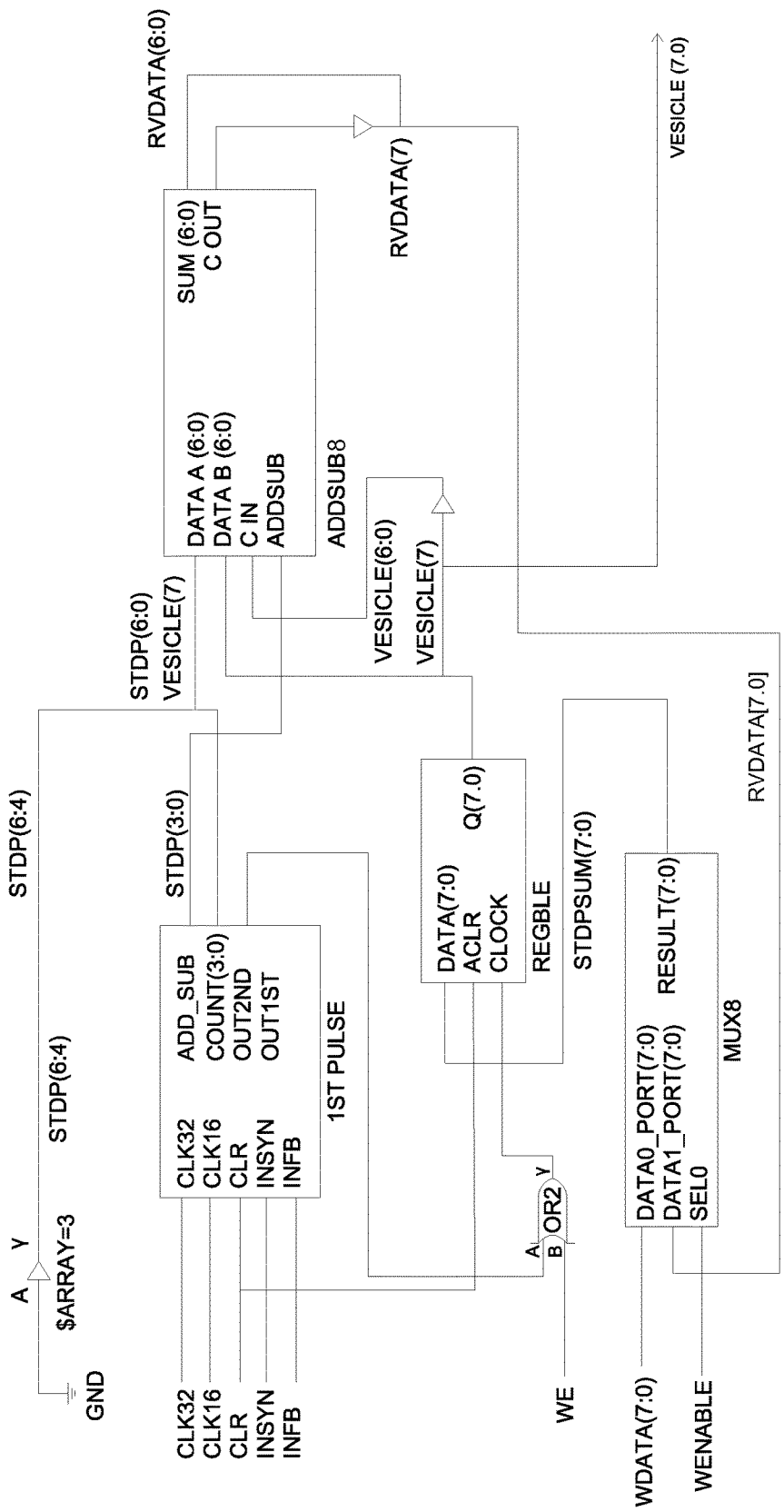
FIG. 1C depicts a CAD system drawing: Circuit diagram of artificial synapse STDP circuit.

The STDP circuit diagram in FIG. 1C comprises a circuit labeled '1STPULSE' used to determine which of two pulses occurred first. The SYNIN signal and the FEEDBACK signals are input to the '1STPULSE' circuit. The FEEDBACK signal is the soma output pulse signal.

Three separate signals and a multi-bit value are output by the 1 STPULSE circuit, comprising ADD_SUB, OUT2ND, OUT1ST and a COUNT{n} value. The COUNT{n} value represents the inverse proportional difference in time between input pulses SYNIN and FEEDBACK, whereby the value is greatest if the two pulses coincide and decreasing in value as the time between the pulses increases. The ADD_SUB signal is logic 1 when the SYNIN signal precedes the FEEDBACK signal and is logic 0 when the FEEDBACK signal precedes the SYNIN signal. The OUT2ND signal is equivalent to the second signal to occur out of input pulses SYNIN and FEEDBACK The OUT1ST signal is equivalent to the first signal to occur out of input pulses SYNIN and FEEDBACK. In the preferred embodiment these signals are used to control an adder circuit labeled ADDSUB8 whereby the COUNT value is added or subtracted from the contents of register REG8LE. Register REG8LE contains a value that represents the VESICLE count, simulating the number of vesicles that are released into the synaptic cleft and which represents the strength of the synapse. An external microprocessor can read or initialize the contents of register REG8LE.

This process can be further explained by referring to block diagram in FIG. 1A. Block diagram FIG. 1A shows the major components of the synapse. An example pulse train {a.b.c.d.e.), shown in a balloon on the top right hand side, is input to the circuit. On each pulse, DOWNCOUNTER is parallel loaded with the SUM value of the current value contained in DOWNCOUNTER and the value contained of the VESICLE LATCH register, added in PARAL- LEL ADDER. On each clock pulse the DOWNCOUNTER is decremented, thus simulating a leaky integrator. The content of VESICLE LATCH is incremented or decremented by a value determined in the PULSE TIMING circuit whenever a FEEDBACK pulse occurs. In the preferred embodiment the PULSE TIMING value is between 0 and 15. The VESICLE LATCH value is decremented when the output pulse precedes the input pulse. In such case the input pulse has clearly not contributed to the generated output pulse. The VESICLE LATCH value is incremented when the input pulse precedes the output pulse. In such case the input pulse has contributed to the generated output pulse, and the synapse is strengthened. In an embodiment, the STDP circuit is modulated by the MODULATOR value, which is a means to simulate the effects of Neuro-Modulators in a biological brain. In further embodiment, the value in the NEUROTRANSMITTER LEVEL is negative when the Most Significant Bit is set to a logic 1. This indicates an inhibitory neurotransmitter type. COUNTER is incremented in such cases and terminates count on zero.

Figure 1D:
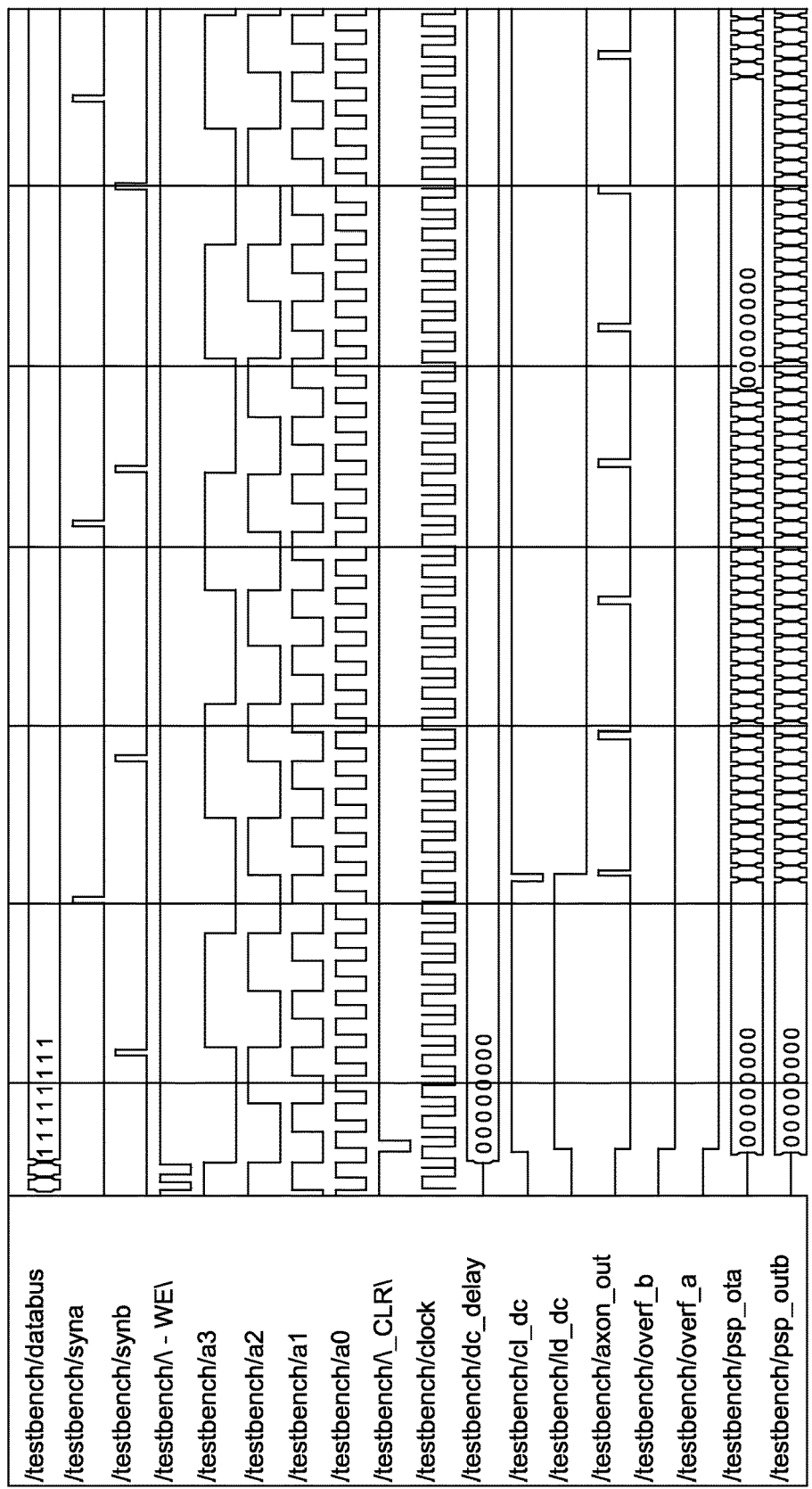
FIG. 1D depicts a CAD system Logic Simulator screen shot: Artificial Neuron circuit waveforms.

FIG. 1D shows a chart of waveforms representing the input and output waveforms of certain parts within the preferred embodiment of the dynamic artificial neuron. The waveforms were generated using the circuit diagrams and shown in FIG. 1B, FIG. 1C and FIG. 2A and associated VHDL code, and using Mentor Graphics ModelSim software which is part of the Actel Libero™ version 8.3 FPGA design suite. The chart signals labeled Synaptic A (SYNA) and Synaptic B (SYNB) are two input signals to two synapse circuits. A0 to A3 are four clock signals derived from input signal CLK. DC_DELAY is the value loaded into DOWN-COUNTER. Cl_dc and ld_dc are two internal signals used to control the DOWNCOUNTER circuit. PSP_OUTA and PSP_OUTB are the simulated Post Synaptic Potential values generated respectively by Synapse circuit A and Synapse circuit B. AXON_OUT is the axon output signal. From this chart it can be observed that the circuit generates an output, relative to the timing of synaptic inputs, in this case Synapse A and Synapse B whereby synapse B is the input with the higher strength value. The output value PSP_OUTB alone is sufficient to cause the soma circuit to generate an output when PSP_OUTA reverts to 0. It must be stressed that this is only true in this one particular case in the preferred embodiment, whereby a high strength value in the VESICLE_COUNT register of synapse circuit B was inserted.

Figure 5:
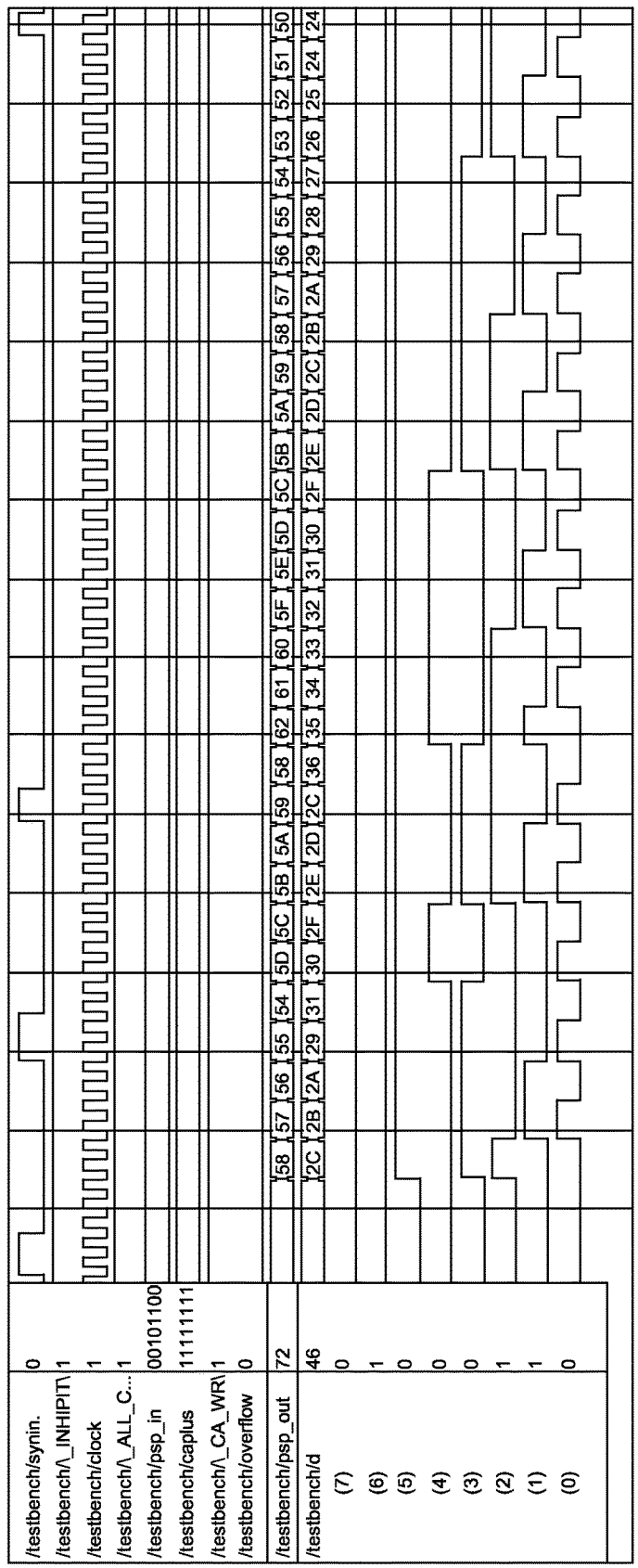
FIG. 5 depicts a CAD system, Logic simulator screen shot synapse circuit waveforms.

FIG. 5 shows the waveforms that are generated in synapse and array adder circuit the preferred embodiment of the invention. The PSP_OUT signal is the sum of the PSP_IN value generated by the previous synapse and the D value generated by this synapse. The SYNIN signal is the input to the synapse Inhibit is a signal that is logic 0 to indicate that this is a inhibiting synapse, and a logic 1 to indicate that the synapse is excitatory. CAPLUS is a value that indicates the total available neurotransmitters in the synapse. Vesicle depletion occurs if this value is zero.

Soma Circuit

Figure 2A:
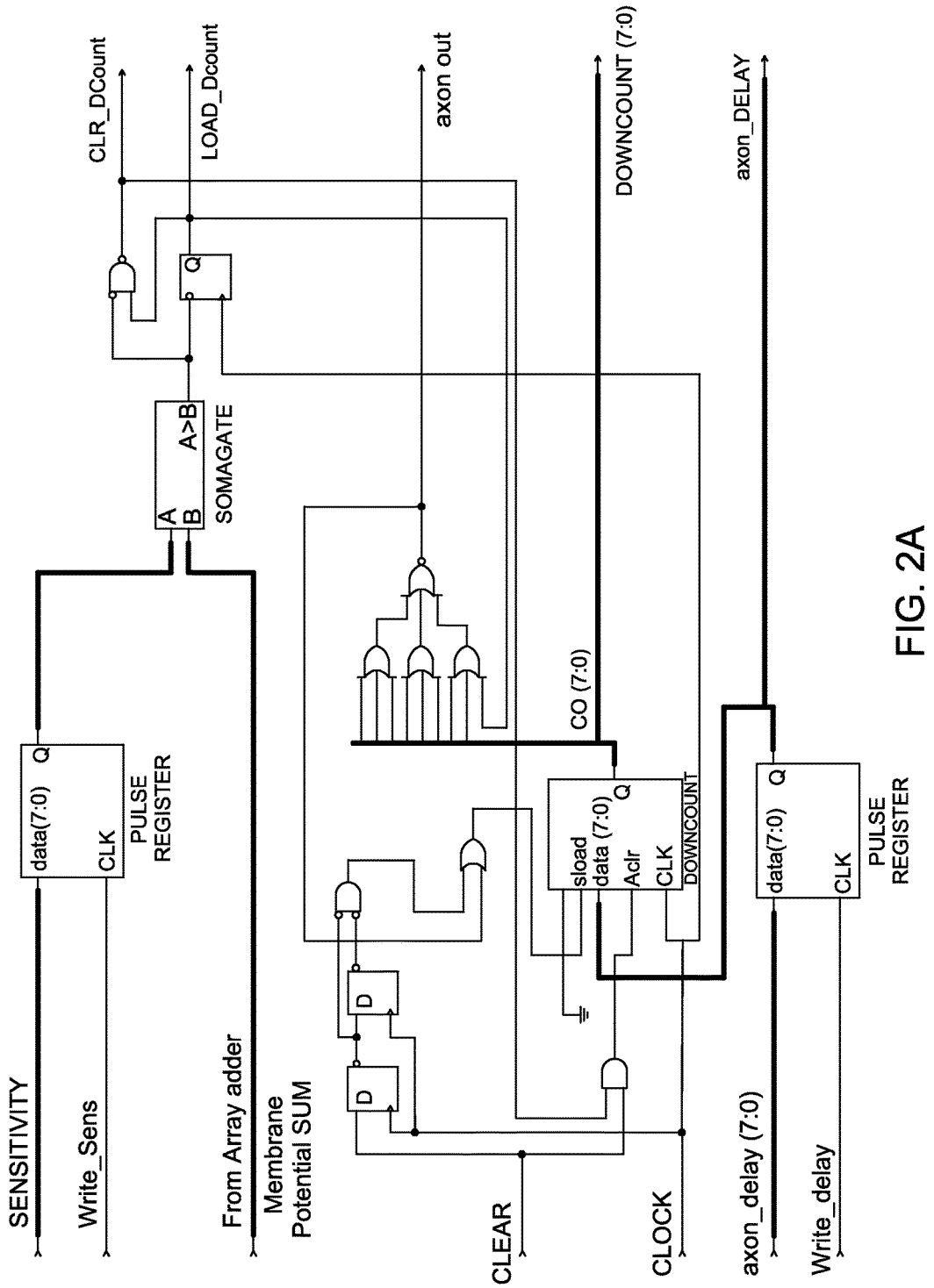
FIG. 2A depicts a CAD system drawing: Circuit diagram of Artificial Soma circuit.

In the preferred embodiment a plurality of synapse circuits is connected to a soma circuit. Referring to FIG. 2A, the MEMBRANE VOLTAGE SUM input represents the integrated value of the output value of all connected synapses. This is a summed value that comprises both inhibiting and excitatory synapse output values. The SENSITIVITY input is the current threshold value derived from previous activation history. They are input to a comparator labeled SOMAGATE which produces an output A.GE.B (A Greater or Equal to B). Device PULSEREGISTER contains the output pulse interval. The PULSEREGISTER value is loaded into counter DOWNCOUNT on the occurrence of the A.GE.B pulse. The AXON_OUT output is active for one clock cycle when counter DOWNCOUNT reaches zero. Counter DOWNCOUNT counts down from its current value and the process repeats, causing the AXON_OUT output to be active each time the counter DOWNCOUNT reaches zero and is loaded with the current value contained in register PULSEREGISTER.

Figure 2B:
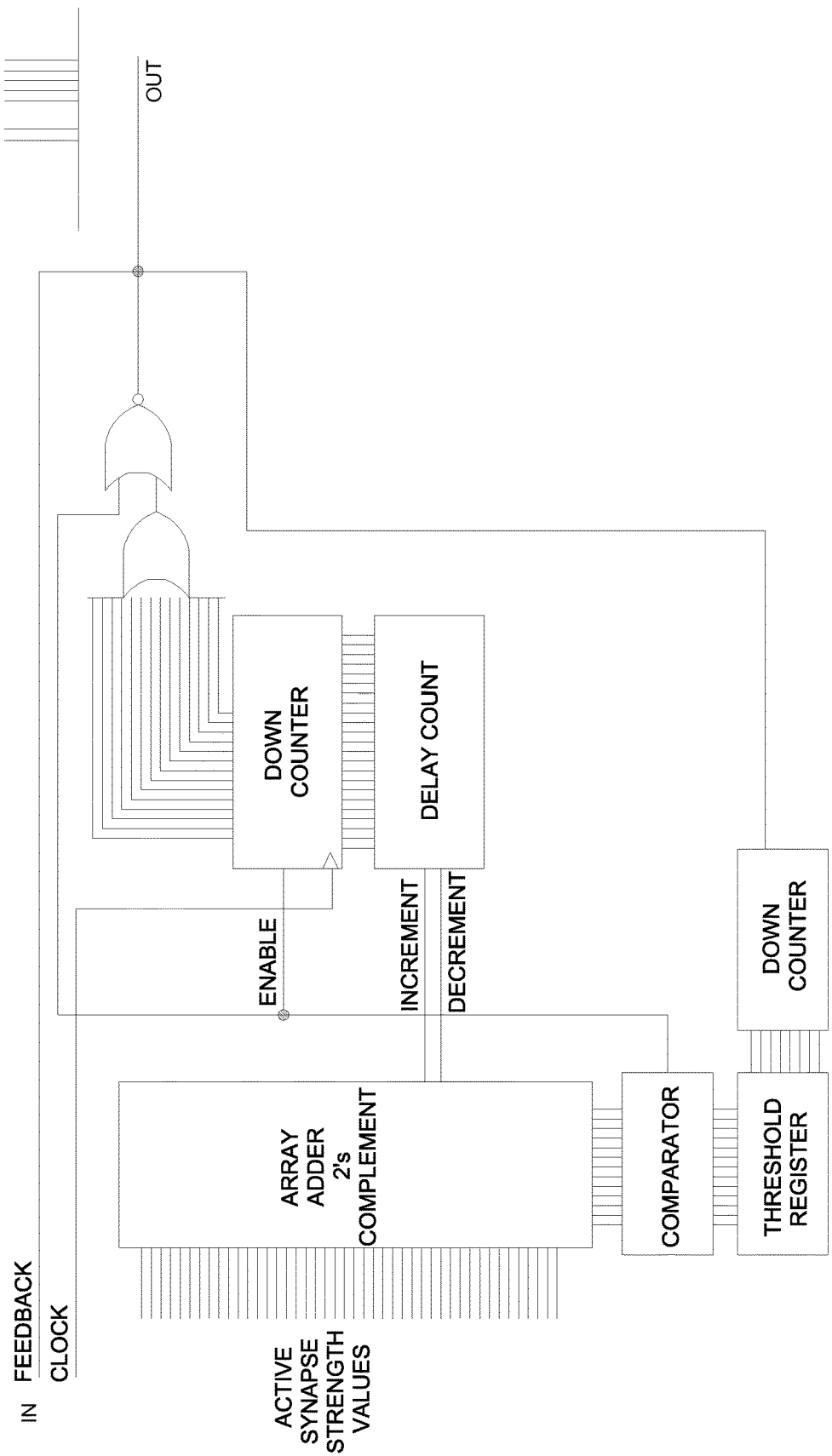
FIG. 2B depicts an Artificial Soma block diagram.

The Soma circuit operation can be further explained referring to block diagram in FIG. 2B. ARRAY ADDER is a custom part developed in VHDL (Very High Speed Integrated Circuit Hardware Description Language) to add a large number of 2-complement synapse output values labeled SUM_OUT to form an artificial membrane potential labeled SUM. The SUM output of the ARRAY ADDER circuit is input to a comparator and compared to the output of a Down-Counter. The DOWN-COUNTER circuit is loaded with a PRESET value. The DOWN-COUNTER circuit is controlled by the soma OUTPUT signal and a clock signal labeled CLK. An output pulse representing an action potential is generated each time the DOWN-COUNTER reaches zero. The number of pulses and the interval between pulses that are generated is a function of the PRESET value and the time delay parameter that specifies when the membrane potential value returns to zero.

Figure 13:
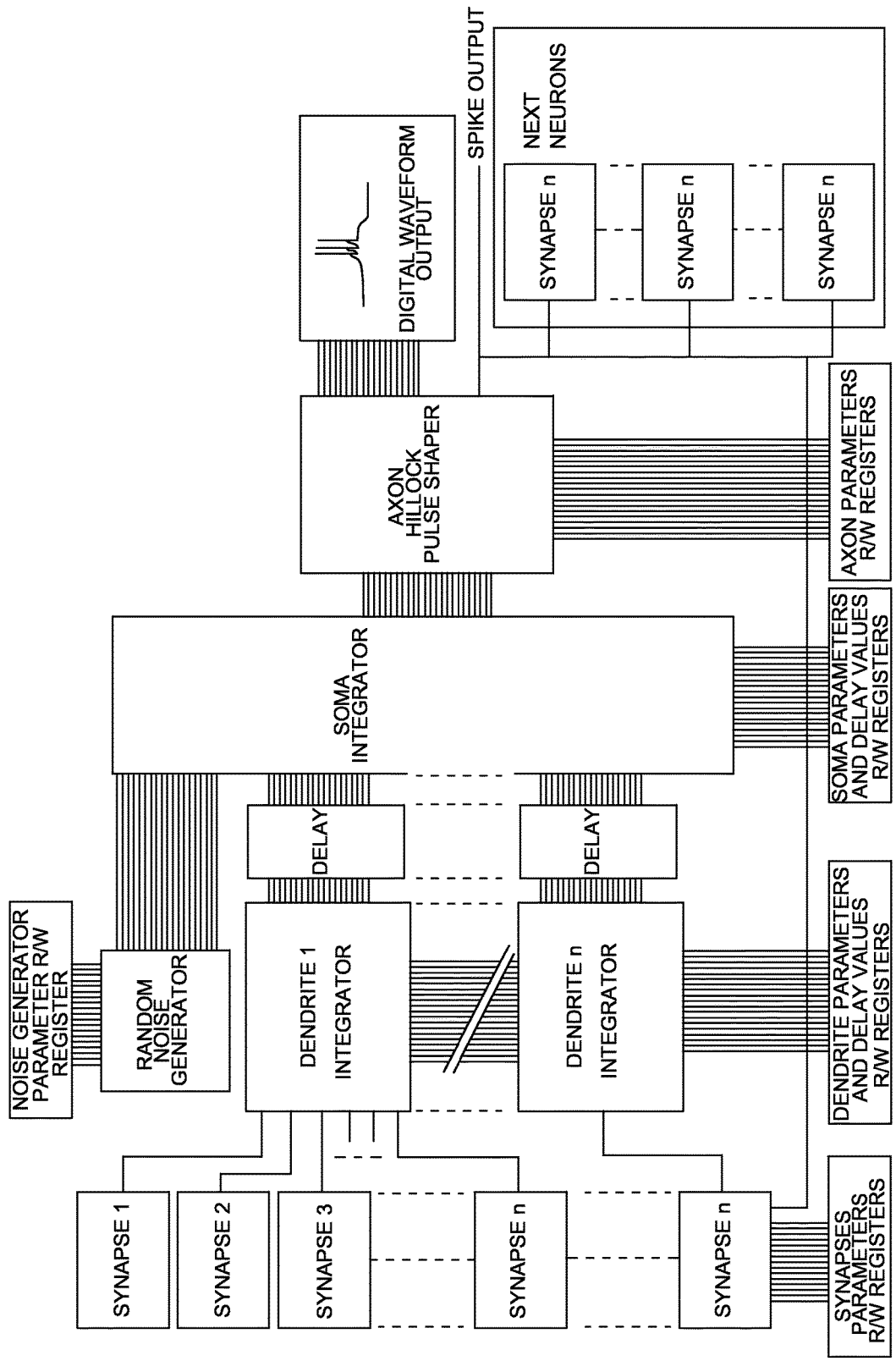
FIG. 13 depicts a block diagram of the present embodiment of the Spiking Neuron with synaptic, dendric, somatic and axon parameter registers

In another preferred embodiment, a plurality of synapse circuits is connected to dendrites and a soma circuit. As is shown in FIG. 13 (described later), the SOMA INTEGRATOR output value represents the integrated value of the output value of all dendrites and connected synapses. This is a summed value that comprises both inhibiting and excitatory synapse output values. Any synapse can be determined to be inhibitory or excitatory by the value contained in the NEUROTRANSMITTER LEVEL register.

The Soma circuit operation can be further explained referring to block diagram in FIG. 13. The DENDRITE INTEGRATORS are a custom parts developed in Verilog to add a large number of 2-complement synapse output values that contribute to an artificial membrane potential generated by the SOMA INTEGRATOR. The output of the SOMA INTEGRATOR circuit is input to the AXON HILLOCK PULSE SHAPER. The AXON HILLOCK PULSE SHAPER circuit is a custom part developed in Verilog, designed to calculate the ionic currents that are present within a biological neuron and have been determined by Hodgkin and Huxley in 1952 and produces a digital output that represents output spikes.

Neuron Circuit

Figure 3A:
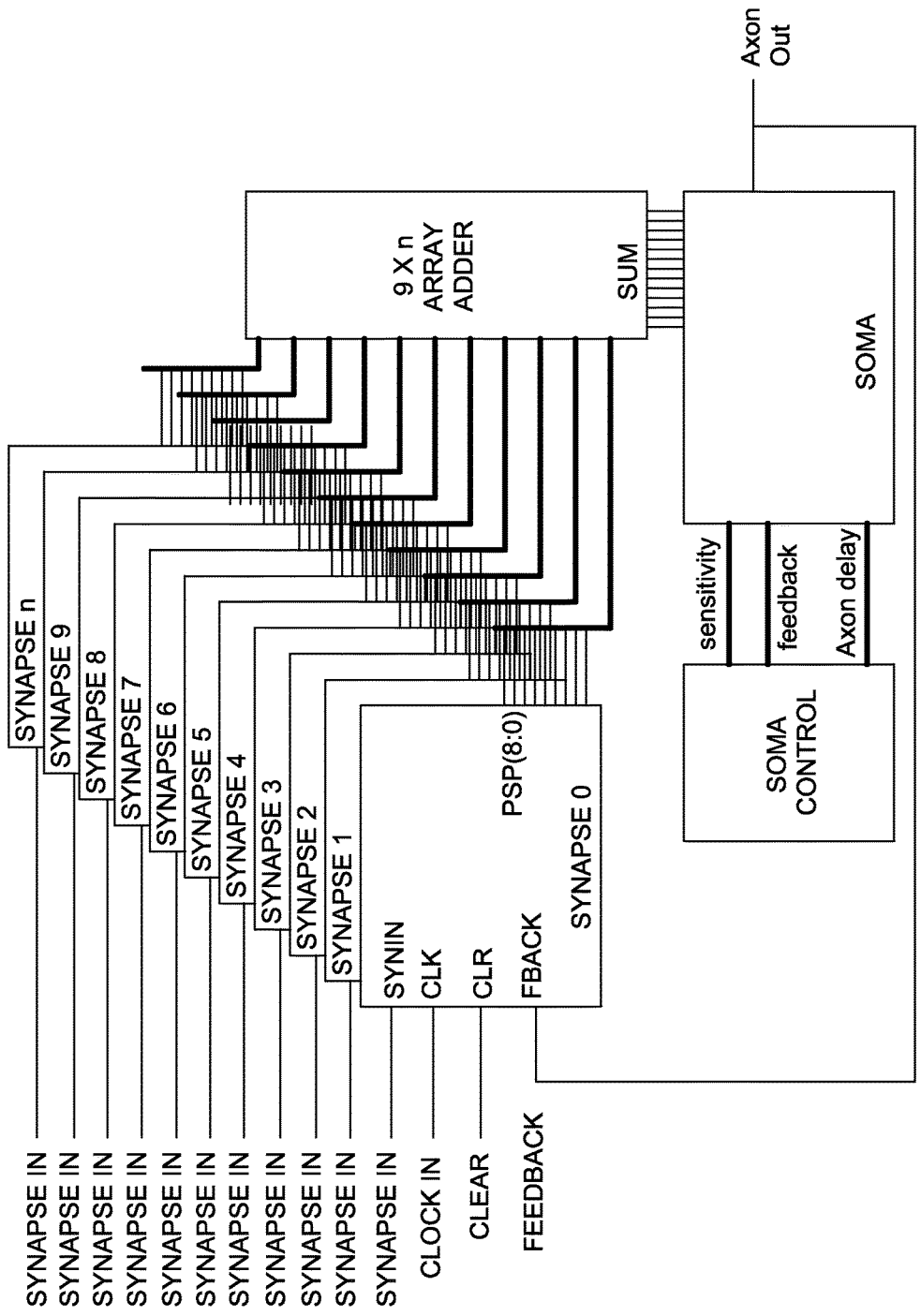
FIG. 3A depicts n Synapses circuits connected to a Soma circuit forming a single neuron.

In the preferred embodiment the neuron circuit consists of one soma circuit and at least one synapse circuit. Referring to FIG. 3A, in the preferred embodiment a neuron comprises one soma and an unlimited number of synapse circuits designated with n. There is no theoretical limitation to the number of synapses that can be connected to a soma circuit. The integration circuit is constructed from individual adder circuits that are incorporated within the synapse circuit and connected to form an array adder circuit. The number of connected synapse circuits is therefore flexible. Drawing 3 shows ten synapses and synapses ( . . . n) connected to an array adder. The integrated sum is input to the soma circuit shown in FIG. 2A. Soma control constitutes a circuit that increases the threshold potential for a period after the soma has fired.

Figure 3B:
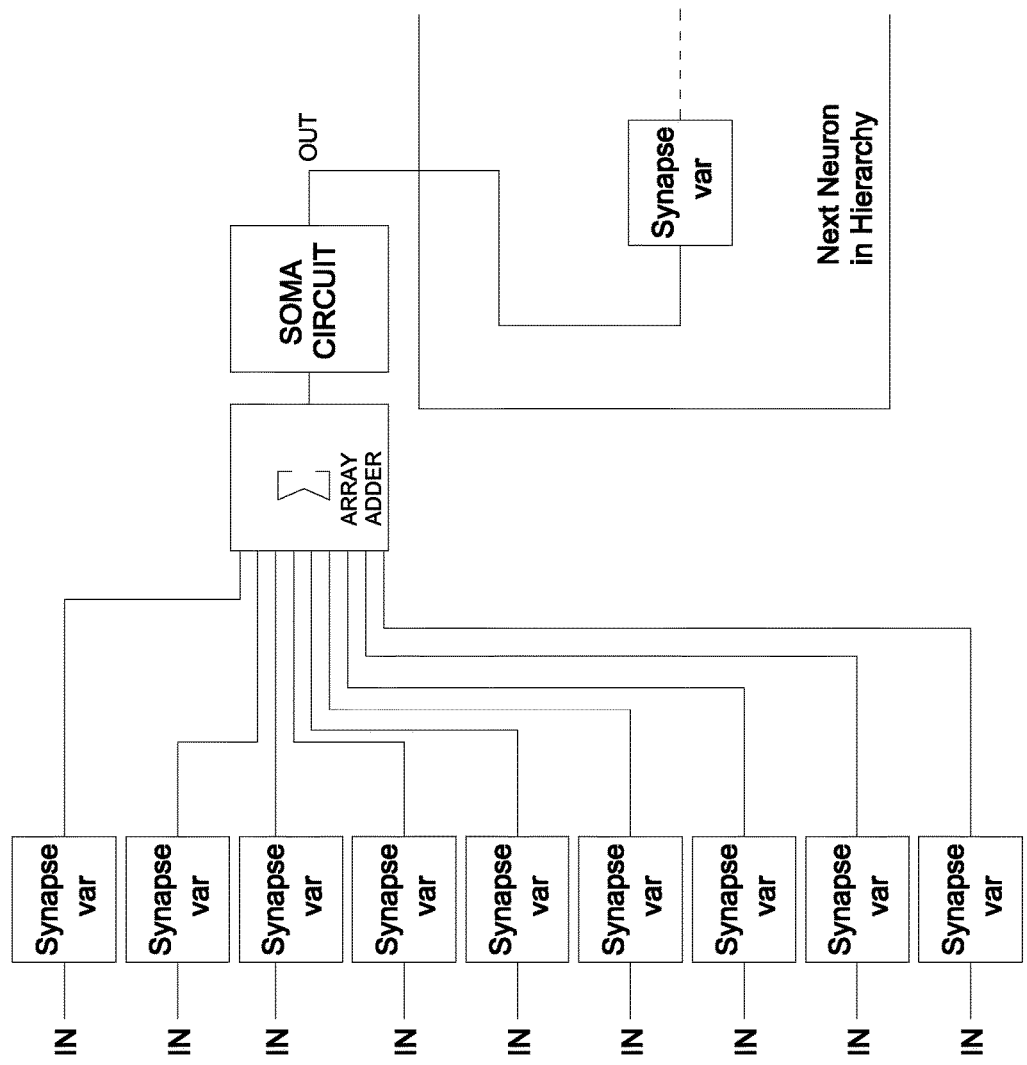
FIG. 3B depicts a Dynamic Artificial Neuron block diagram.

The neuron circuit operation can be further explained referring to block diagram in FIG. 3B. In FIG. 3B the Post Synaptic Potential output value of nine synapses, each incorporating a variable strength parameter "var", are connected to an array adder circuit producing a membrane potential value. The membrane potential is input to the soma circuit which generates an output pulse or pulse train when the membrane potential reaches or exceeds a variable threshold potential value. The soma output pulse is connected to a synapse of the next neuron in the hierarchy, or a plurality of synapses.

Figure 16:
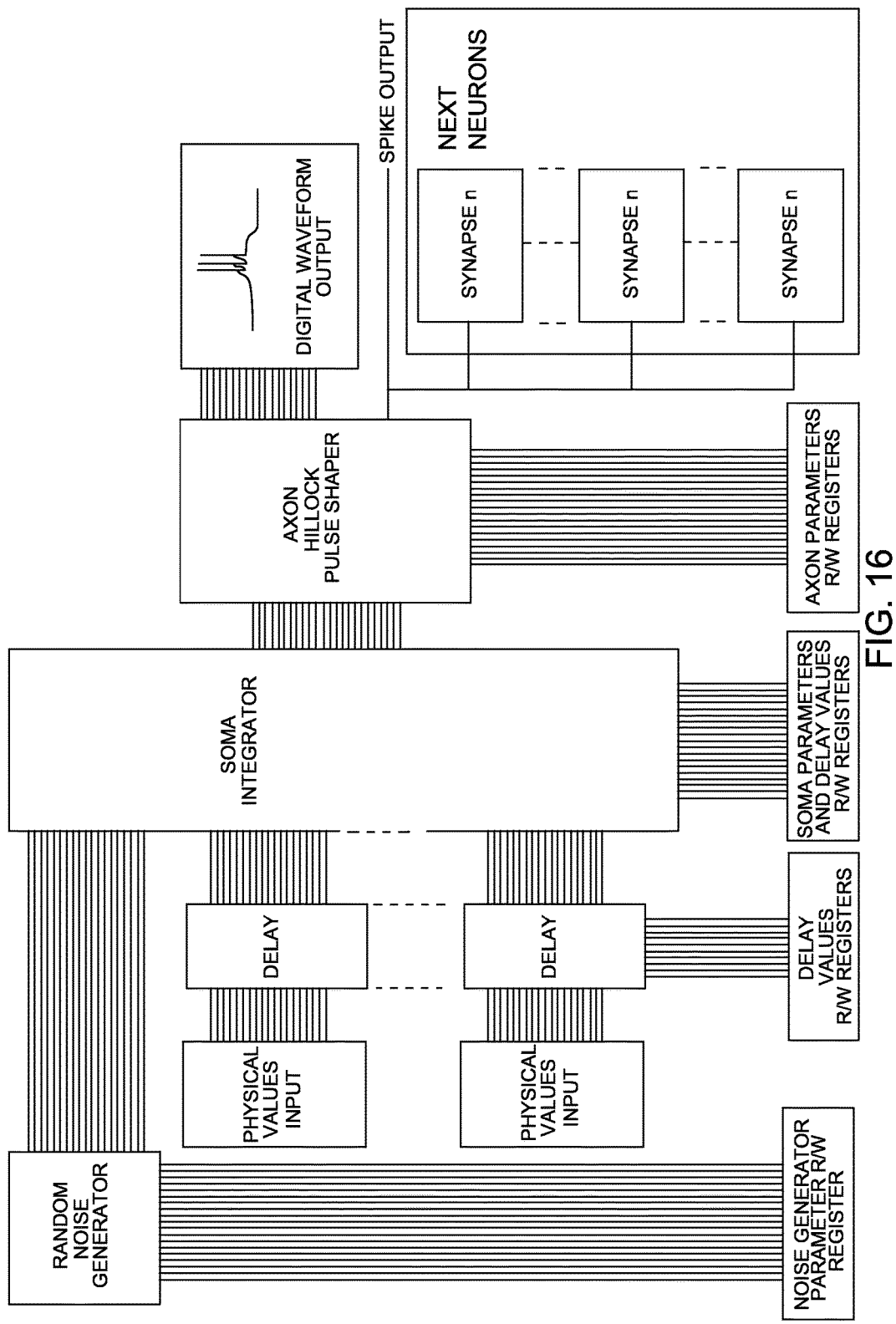
FIG. 16 depicts a block diagram of a sensory neuron that produces pulses (spikes) from physical input values

A special case of neuron circuit is shown in FIG. 16. This neuron comprises a sensory neuron, simulating a sensory neuron that occurs in biology in the skin and other organs in the body. The sensory neuron receives physical values which may be delayed in the delay circuit labeled DELAY. The SOMA integrates the physical values and produces a digital value that represents the membrane potential of a biological neuron. The membrane potential is input to the AXON HILLOCK PULSE SHAPER designed to calculate the ionic currents that are present within a biological neuron and have been determined by Hodgkin and Huxley in 1952 and to produce a digital output that represents output spikes.

Dynamic Artificial Neuron Array (Dan Array) Circuit

Figure 4:
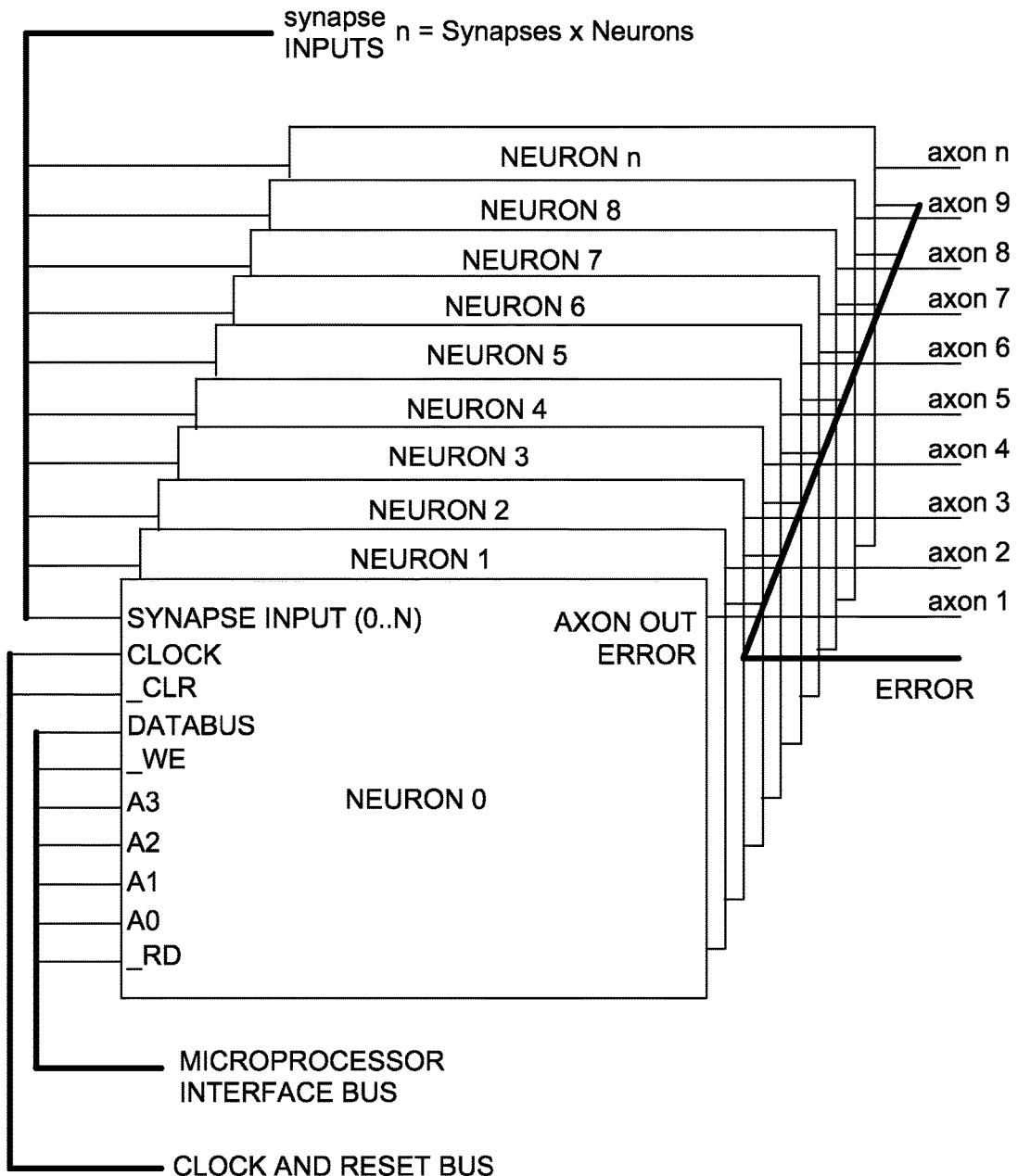
FIG. 4 depicts an Artificial Neuron Array device circuit consisting of multiple neurons.

In the preferred embodiment, the Dynamic Artificial Neuron array comprises a plurality of artificial neurons as described above, organized in a hierarchical array. In one embodiment the stored parameters in the array are accessible by a micro-processor to seed the array with synaptic strength and soma timing values. FIG. 4 refers to a device containing a number of artificial neurons that are externally connected and wherein each synapse input and soma output is accessible.

Method of Reading and Writing Dynamic Neuron Training Models

The current invention comprises a function library and relates to Artificial Intelligence systems and devices. Within a dynamic neural network (the "intelligent target device") training model values are autonomously generated in during learning and stored in synaptic registers. In an additional embodiment, during training, the operator may also elect to write values to synapses, dendrites, somas and axons to configure the neuron as a specific neural type. One instance of an intelligent target device is the "Autonomous Learning Dynamic Artificial Neural Computing Device and Brain Inspired System", described in US Patent Pub. No. 20100076916 and referenced in whole in this text. A collection of values that has been generated in synaptic registers comprises a training model, which is an abstract model of a task or a process that has been learned by the intelligent target device. A means is provided within the intelligent target device to copy the training model to computer memory. A collection of such training model sets are stored within a function library on a computer storage facility, such as a disk, CD, DVD or other means.

Figure 11:
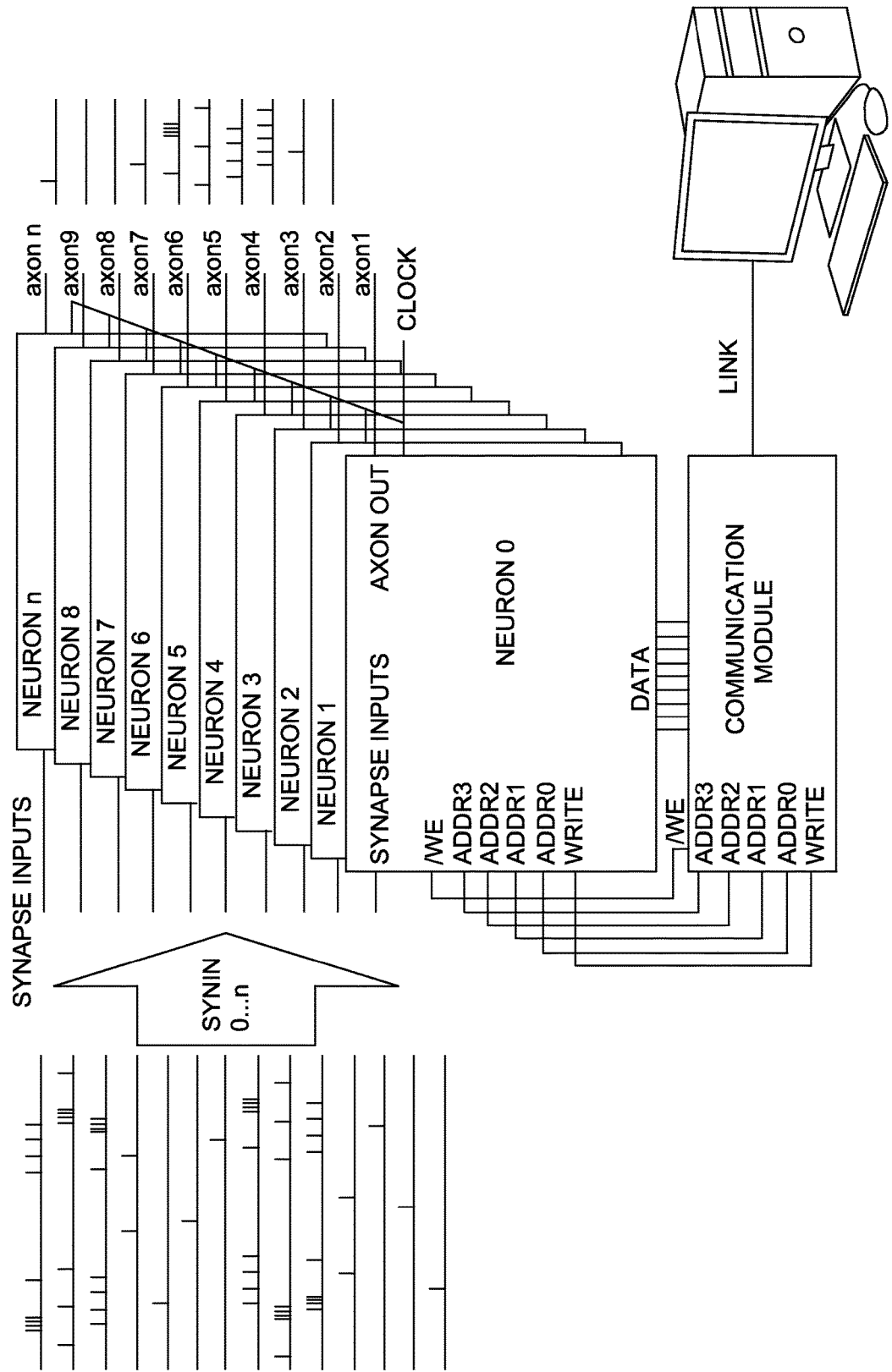
FIG. 11 represents a preferred embodiment of the function model library creation and uploading method.

FIG. 11, labeled "Method of Reading and Writing Dynamic Neuron Training Models", represents a preferred embodiment of the function model library creation and uploading method. The communication module reads registers and provides an access means to an external computer system. The communication module is typically a microcontroller or microprocessor or equivalent programmable device. Its databus comprises a method of communicating with the hardware of the dynamic neuron array to receive or send data to binary registers.

Neuron numbers 0 to n contain registers that may be read or written to under program control. The lines marked A0 . . . An represent address lines, used to point at a specific synaptic register within the neuron matrix to read or write. The line marked _RD indicates that a READ operation is to be performed, retrieving data from the dynamic neuron matrix. The line marked WE indicates that a WRITE operation is to be performed and that the data present on the DATABUS is to be written to the register that is addressed by lines A0 to An. The line marked CLOCK (CLKOUT) is a timing signal that determines the speed at which events take place in the dynamic neural network. The operation of reading and writing DATA through the DATABUS, under control of the Address lines A0 . . . An, and the _RD or _WE signals, works independent of the dynamic neuron function, which receives pulse information from sensory devices. The lines marked "Synapse INPUTS" receive a pulse pattern as indicated under "Synapses In" in FIG. 1A, and produce an output pattern that is relative to this input and previous occurrences of similar input patterns.

The dynamic neuron function learns to recognize pulse trains that occur in time and in relation to one another, in the manner as described in detail in patent application number 20100076916. Sequences of input pulses of a specific time relationship train the dynamic neural network and produce values in registers that are addressed by address lines A0 . . . An. A large number of such register values comprise a training model. In a typical device 10,000-15,000 dynamic neurons comprise a single column. A typical library entry is comprised of, but not limited to, the register values read from one entire column.

Figure 12A:
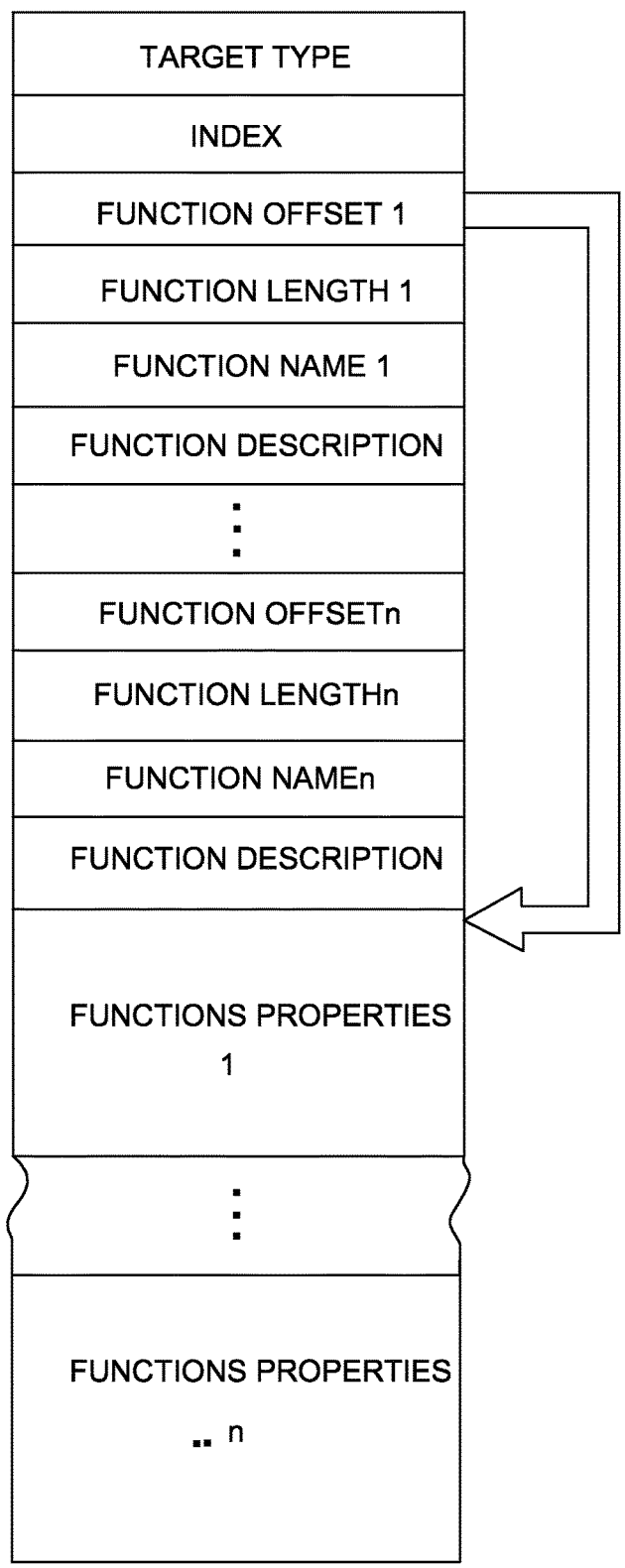
FIG. 12A depicts a structure of the function library header.

FIG. 12A shows a structure of the function library header. The library file contains one or more functions. It is structured and indexed in a manner that reflects its contents. The function library header contains a target type of the artificial intelligent device and an index. The index contains the number of functions in the library (8 bytes), each function offset address (8 bytes), the length of the function (8 Bytes), the function name (16 Bytes), and a 40 character alphanumeric field used for a short function description. Each entry in the Neural Function library consists of neural properties, retrieved by an electronic data processing system from the distributed memory of an artificial intelligent device. The function properties section contains a register value of hundreds to thousands of neurons, comprising a single function.

Figure 12B:
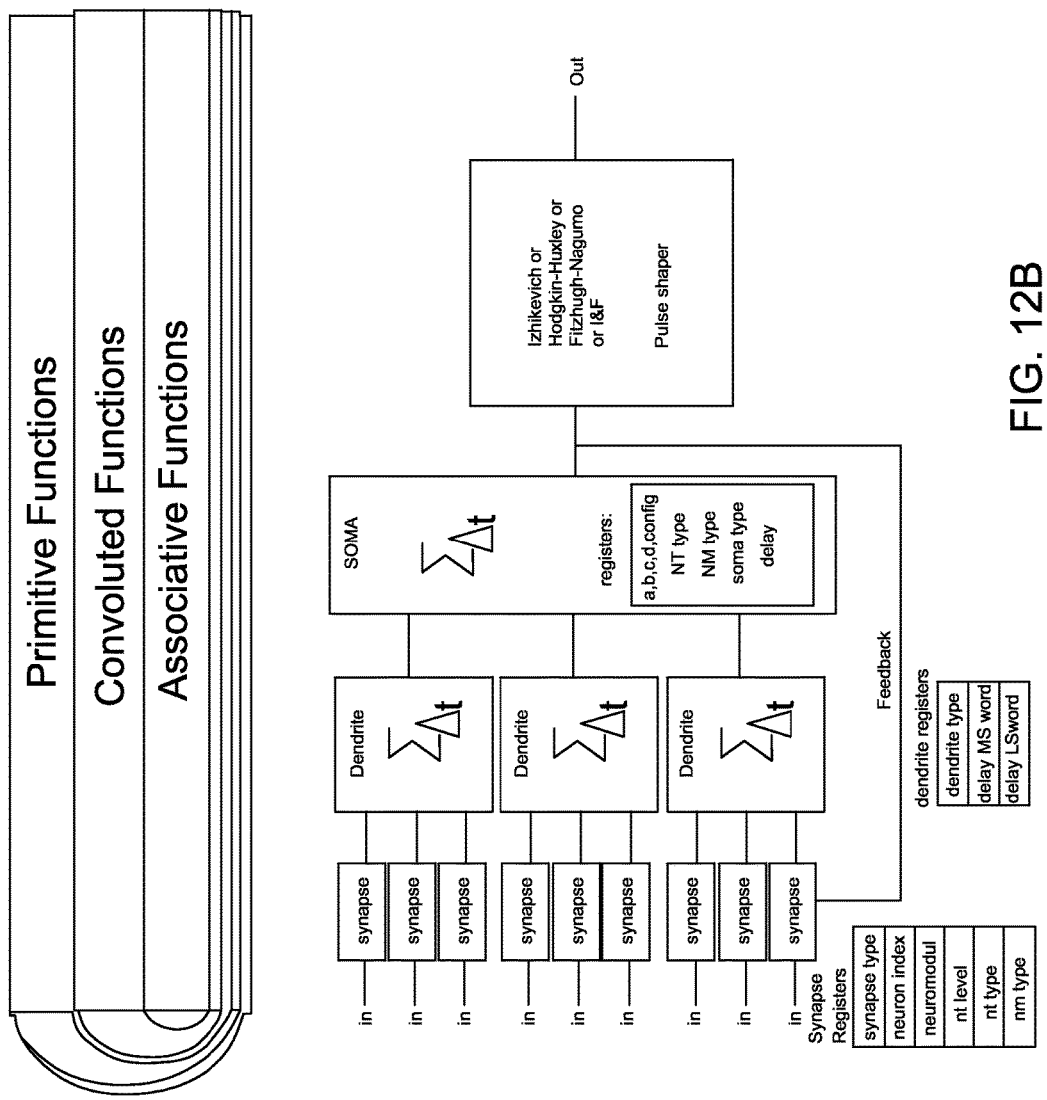
FIG. 12B depicts a block diagram of components of the Spiking Neuron with STDP learning through Feedback

FIG. 12B represents a block diagram of components of the Spiking Neuron with STDP learning through Feedback. The functions in the library can be separated into Primitive, Convoluted and Associative functions. The primitive functions are comprised of a set of properties that are generated by manual training and subsequent autonomous learning. During manual training the neurotransmitter types, level and neuromodulator sensitivities are defined for each synapse to prime the device to respond to defined stimuli. The convoluted functions are comprised of multiple sets of primitive functions and a connectome. The connectome defines what axons and neurons are connected to which synapses. Associative functions are comprised of multiple sets of convoluted functions and the connectome.

FIG. 13 represents a block diagram of another embodiment of the Spiking Neuron in the present invention. Synapses are connected to a digital dendrite circuit where their receptor values are spatially integrated and produce a dendrite value. A configurable delay circuit is inserted between the dendrite and the soma integrator. The soma integrator sums the delayed dendrite values to produce the simulated membrane potential, which is applied to the Axon Hillock pulse shaper. The Axon Hillock pulse shaper calculates four simulated ionic currents that are derived from the simulated membrane potential. Integration of these four simulated ionic currents produces the output value, which may be plotted to an analog waveform as shown, and is also output as a binary pulse or pulse burst. Each component, such as synapses, dendrites, delays, soma and axon has configuration parameters that define the behavior of the component.

Figure 14:
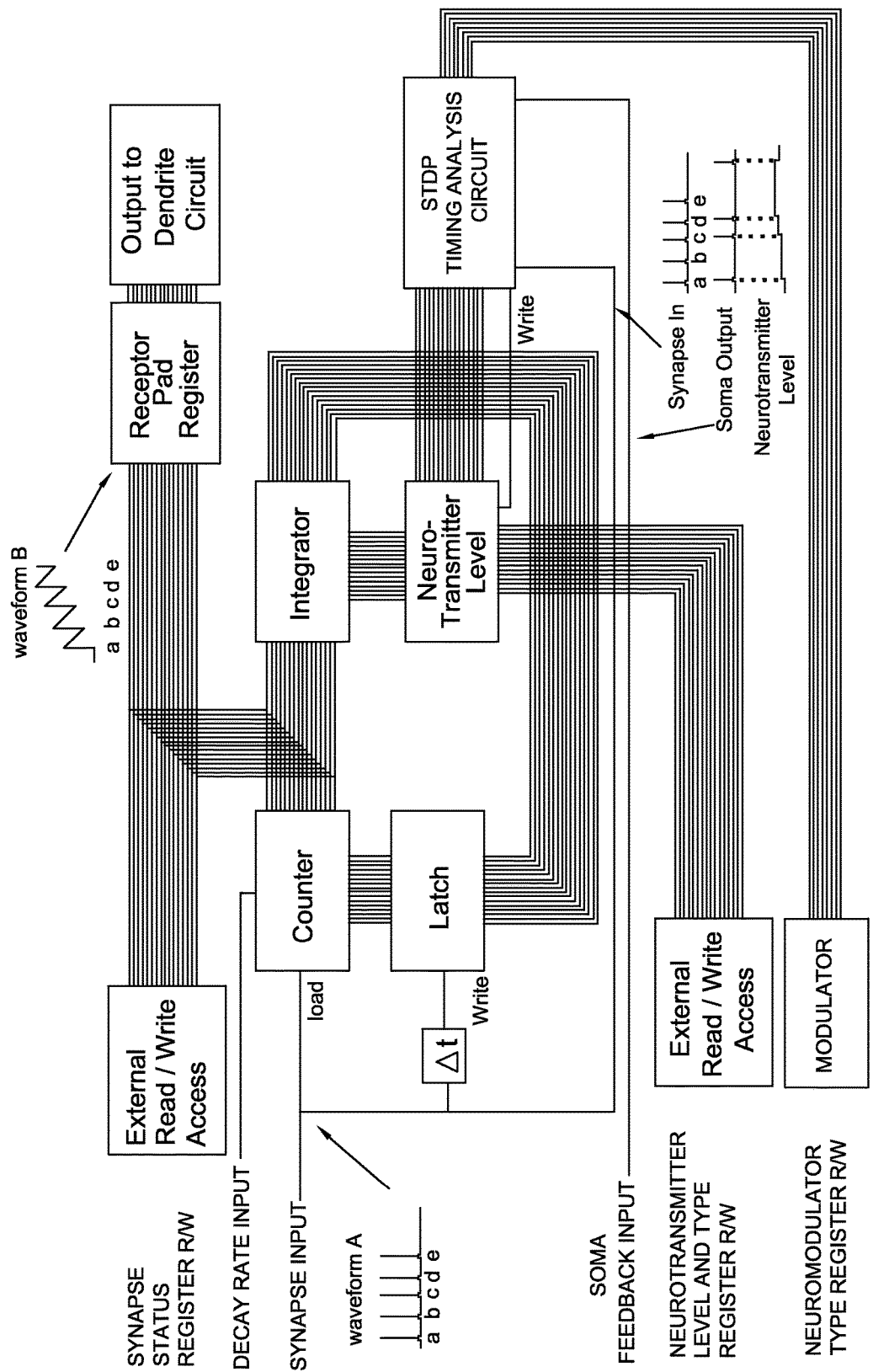
FIG. 14 depicts a block diagram of the present embodiment of the dynamic synapse

FIG. 14 represents a block diagram of another embodiment of the dynamic digital synapses in the present invention. A set of pulses (a,b,c,d,e) is shown to arrive at the SYNAPSE INPUT. The rising edge of each pulse loads the digital multibit value from LATCH into the COUNTER circuit. COUNTER is configured as a count-down counter for values greater than 0 and a count-up counter for values smaller than 0. COUNTER is also configured to terminate counting when the value reaches 0. The multibit digital output of COUNTER represents to Receptor value present at the output and connected to the DENDRITE circuit. Waveform B is an analog representation of the COUNTER value on the occurrence of an input signal Waveform A on the SYNAPSE INPUT. The COUNTER output also connects to the INTEGRATOR circuit, together with the present value stored in the NEUROTRANSMITTER LEVEL register. The integrated sum is stored in the LATCH on the occurrence of the next rising edge of the SYNAPSE INPUT signal. The NEUROTRANSMITTER LEVEL register value is updated with the results of the STDP TIMING ANALYSIS circuit. The STDP TIMING ANALYSIS circuit is mitigated by the presence of a NEUROMODULATOR value which expresses the presence and the intensity of a simulated neuro-modulator. Learning may be enhanced or suppressed in the presence of a Neuromodulator type, depending on the level and type of that neuromodulator. The Receptor Pad register, the NEUROTRANSMITTER LEVEL register and the MODULATOR register are accessible for reading and writing by external data processing equipment.

Figure 15:
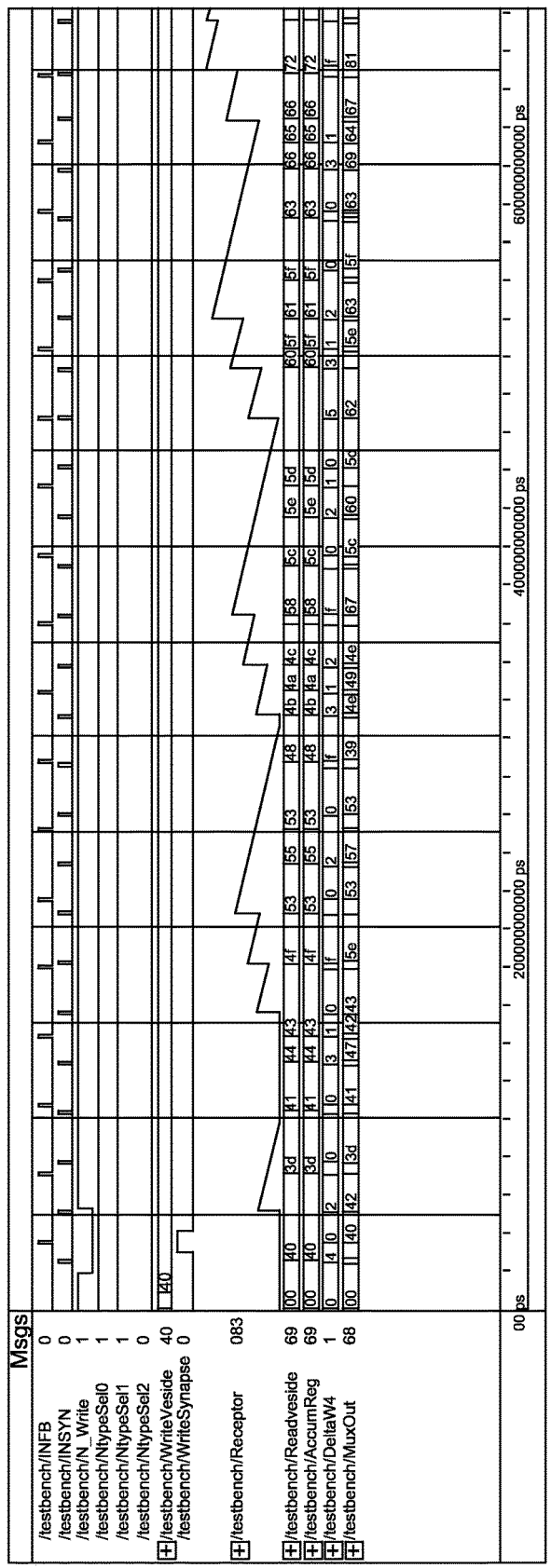
FIG. 15 depicts a CAD system simulation graphs of the present embodiment of the digital dynamic synapse circuit

FIG. 15 represents a CAD system simulation of another embodiment of the dynamic digital synapses in the present invention. The top line is labeled "INFB" (Input FeedBack) and represents feedback pulses received from the simulated post-synaptic neuron. The next line is labeled "SYNIN" and represents the presynaptic input pulses. The third line represents a Not_Write enable signal, which is active low to allow writes to the NEUROTRANSMITTER LEVEL register in FIG. 14. The next 3 lines are labeled NTypeSEL0 to NTypeSEL2 which select the neurotransmitter type used in this synapse. The next line labeled "WRITEVESICLE" represents the value that is to be written to the NEUROTRANSMITTER LEVEL register. This value is set to 40 Hexadecimal in this simulation. On the leading edge of the next signal, WRITESYNAPSE, the value 40H is written into the NEUROTRANSMITTER LEVEL register. This provides a means to initialize the NEUROTRANSMITTER LEVEL register programmatically, or to write values retrieved from a training model library to registers. The next line is labeled RECEPTOR and represents the subsequent digital values stored in the RECEPTOR PAD register, plotted as an analog waveform. The next line labeled "READ-VESICLE" represents the dynamic contents of the NEUROTRANSMITTER LEVEL register after learning occurs. It may be observed that the NEUROTRANSMITTER LEVEL register value is increased and decreased resulting from the timing difference between INSYN and INFB signals.

FIG. 16 represents a block diagram of another embodiment of a Spiking Neuron in the present invention, specifically a simulated Sensory Spiking Neuron. The structure of the Sensory Spiking Neuron is very similar to the Spiking Neuron depicted in FIG. 13. The synapses are substituted for registers that receive a physical input value. This physical input value may be derived from an external electronic data processing device or a discrete sensory device that is capable of producing a digital multibit value. In another embodiment, the STDP circuit determines the Synaptic Time Dependent Plasticity (STDP) modifier value by determining a first value representing the time that has elapsed between the activation of a first SPIKE OUTPUT signal and the activation of the SYNIN signal. The SPIKE OUTPUT signal is produced by the AXON HILLOCK circuit in FIG. 1.

The STDP circuit determines a second value representing the time that has elapsed between activation of the SYNIN signal and the next activation of the SPIKE OUTPUT. The STDP modifier value is derived from the difference between the second value and the first value.

Figure 17:
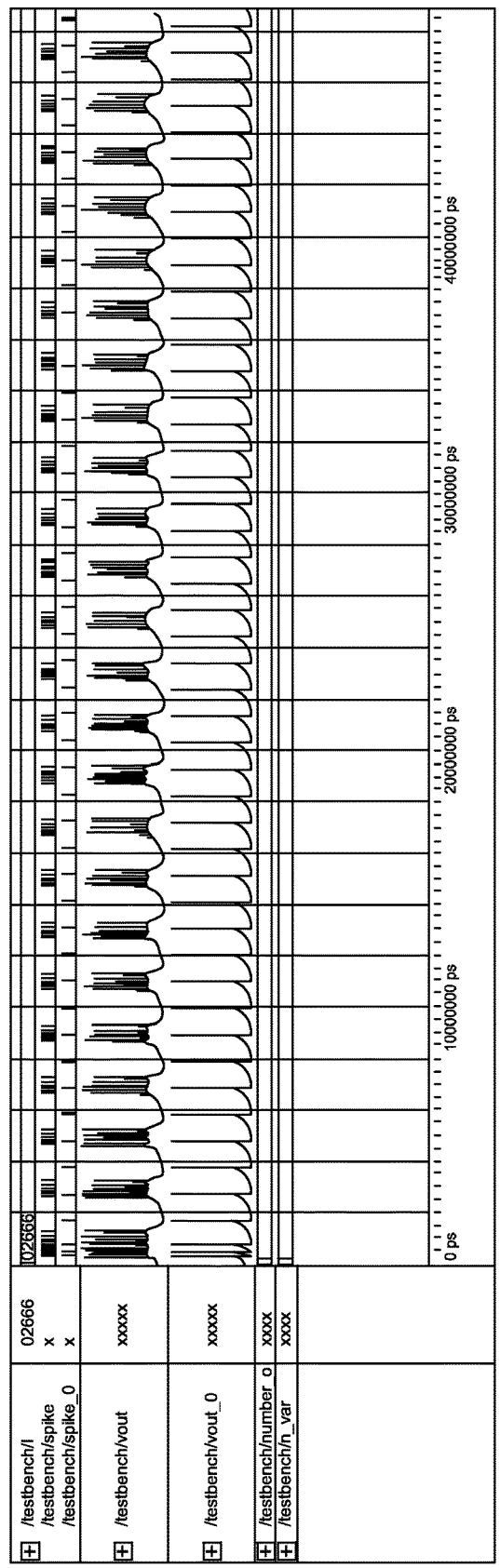
FIG. 17 depicts a CAD system simulation graphs of the present embodiment of the digital Axon Hillock circuit, with digital values plotted as analog signals.

FIG. 17 represents a CAD system simulation of another embodiment of the digital axon hillock circuit in the present invention. The top line labeled I is a value that represents the simulated collective current injected by the soma circuit, that is directly related to the simulated membrane potential and the conductance of the simulated soma membrane. The next two lines labeled SPIKE and SPIKE_0 represent the digital output of two simulated neurons configured with different parameters through a microprocessor interface. The lines labeled VOUT and VOUT_0 represent the digital multi-bit output of the same two simulated neurons configured with different parameters through a microprocessor interface. The lines labeled NUMBER_0 and N_VAR represent internally used signals and can be ignored for the purpose of this illustration. The simulations shows the ability of the neural model to abstract different neural cell types depending on configuration parameters illustrated in block diagram shown in FIG. 13 and FIG. 16.

Within the artificial intelligent device a mechanism allows the retrieval of the properties of each synapse, dendrite and neuron and to transmit this data over a communication bus under control of the electronic data processing device. This bus can be a memory-mapped parallel connection or fast serial connections such as USB, or any other bus structure. The Electronic Data Processing device must supply control information, such as the specific synapse register address or a sequence index. The artificial intelligent device responds to a request by submitting the data stored in the addressed synapse, dendrite or soma register. This may be followed by the assertion of a control flag that indicates that the data is stable and available for reading. In a preferred embodiment each entry in the functional properties is in the format:

Each Synapse:

| | |
|---|---|
| 1 byte MSB | Synapse type and subtype and flag. |
| 000 | Electrical Synapse |
| 001 | Chemical Synapse |
| XXX00000-XXX11111 | Reserved |
| 6 bytes | Neuron Index (The neuron that this synapse responds to) range = 280 trillion $2.8*10^{14}$ |
| 2 bytes | Neurotransmitter type, the top bit indicating an inhibitory (1) or a excitatory (0) type |
| 2 bytes | Neurotransmitter level |
| 2 bytes | Neuromodulator sensitivities |

Each Dendrite:

| | |
|---|---|
| 1 byte | Dendrite type and flag |
| 010 | Dendrite with no delays |
| 011 | Dendrite with specified delay |
| XXX00000-XXX11111 | Reserved |
| 1 byte | Dendric delay, 28 cycles = 0-1.5 ms with 5.8 us resolution |
| 5 bytes | Dendrite index, $2^{40}$ = 1.1 trillion |

Each Neuron:

| | |
|---|---|
| 1 byte | Neural type and flag |
| 110 first 3 bits | Integrate and Fire soma pulse shaper |
| 101 first 3 bits | Izhikevich axon soma pulse shaper |
| 111 first 3 bits | Hodgkin-Huxley Axon Soma pulse shaper |
| xxx 00000- next 5 bits to xxx11111 | Cell type e.g. pyramidal, stellate, bipolar, unipolar, Purkinje, Golgi, Granule, etc |
| 1 byte | Cell subtype, as above. a total of 8192 cell types |
| 1 byte | Soma response characteristics |
| 5 bytes | Soma index. 40 Bits addressable range: 1 Trillion cores. |
| 2 bytes | Reserved |
| 4 bytes | Axon delay |

The output of the pulse shaper can be a single or multiple spikes.

In another embodiment of the present invention, a plurality of soma circuits is connected through a plurality of dynamic synapse circuits in a hierarchical array. An artificial neuron consists out of at least one synapse circuit, one dendrite, one soma circuit and one axon hillock circuit. After receiving plurality of input pulses from one or more sensory devices, the soma circuit produces one or more action potentials, in case of previously learned pattern. Different artificial neurons produce different output pulses given the same input signals. One instance of neuron output waveforms is shown in FIG. 17.

Favorably, the present invention provides a dynamic neural function library that aids in training an artificial intelligent device in which the training period is relatively short as compared to other training methods. Further, the present invention also allows other artificial intelligent devices to reuse one or more of the functions learned by a first artificial intelligent device. A common hardware platform, specifically designed for the creation of cognitive systems, aids in the creation of a generic growth path. Dynamic Neural Function Libraries complete the creation of a growth path with re-usable and combinable functions.

I claim:

1. A method of creating a reusable dynamic neural function library for use in artificial intelligence, the method comprising the steps of:
   sending a plurality of input pulses in form of stimuli to a first artificial intelligent device, where the first artificial intelligent device includes a hardware network of reconfigurable artificial neurons and synapses;
   learning at least one task or a function autonomously from the plurality of input pulses, by the first artificial intelligent device;
   generating and storing a set of control values, representing one learned function, in synaptic registers of the first artificial intelligent device;
   altering and updating the control values in synaptic registers, based on a time interval and an intensity of the plurality of input pulses for autonomous learning of the functions, thereby creating the function that stores sets of control values, at the first artificial intelligent device; and
   transferring and storing the function in the reusable dynamic neural function library, together with other functions derived from a plurality of artificial intelligent devices, allowing a second artificial intelligent device to reuse one or more of the functions learned by the first artificial intelligent device.

2. The method of claim 1, wherein the reusable dynamic neural function library is transferable to a storage medium.

3. The method of claim 1, further comprising:
   constructing at least one complex function by combining and continuous learning of the functions; and
   updating the control values in the synaptic registers that represent previously uploaded functions.

4. The method of claim 1, wherein the stored control values determine behavior of a processing node of the first artificial intelligent device.

5. The method of claim 4, wherein the behavior of the processing node is an output pulse, or a sequence of output pulses, that represent an integrated time relationship and spatial distribution between the plurality of input pulses, integrated according to stored values that represent a learned timing sequence and relative positioning of previously received pulses.

6. The method of claim 1, wherein the first artificial intelligent device autonomously develops a relational association between the learned functions.

7. The method of claim 1, wherein the learned functions stored in the reusable dynamic neural function library further comprise a set of first functions, a set of second functions, and a set of third functions.

8. The method of claim 7, wherein the set of first functions is generated by exposing the first artificial intelligent device to the plurality of input pulses in order to prime the first artificial intelligent device to respond to a defined stimuli; and further autonomous learning of the first artificial intelligent device from a plurality of samples of input pulses to perform a desired behavior.

9. The method of claim 7, wherein the set of second functions comprises relational association of multiple sets of first functions.

10. The method of claim 7, wherein the set of third functions comprises relational association of multiple sets of second functions.

11. The method of claim 1, wherein the reusable dynamic neural function library includes a header that includes a target type of artificial intelligent device.

12. The method of claim 1, wherein the reusable dynamic neural function library includes a header that includes an index describing one or more of: a number of functions in the function library, an offset address for each function in the function library, a length of each function in the function library, a name of each function in the function library, and a description of each function in the function library.

13. The method of claim 1, wherein the reusable dynamic neural function library includes a primitive function, wherein the primitive function comprises a set of properties generated by manual training and subsequent autonomous learning.

14. The method of claim 1, wherein the reusable dynamic neural function library includes a convoluted function, wherein the convoluted function comprises a plurality of sets of primitive functions and a connectome.

15. The method of claim 1, wherein the reusable dynamic neural function library includes an associative function, wherein the associative function comprises a plurality of sets of convoluted functions and a connectome.

16. The method of claim 1, wherein the stored control values further include dendric control values, somatic control values and axon hillock control values.

17. The method of claim 1, wherein the reusable dynamic neural function library includes one or more address values indicative of addresses assigned to each respective neuron.

* * * * *